US 8,083,421 B2

(12) United States Patent
Westerweck

(10) Patent No.: US 8,083,421 B2
(45) Date of Patent: *Dec. 27, 2011

(54) AF/ZOOM SHUTTER WITH TWO BLADES FUNCTION

(75) Inventor: Lothar Westerweck, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/624,266

(22) Filed: Nov. 23, 2009

(65) Prior Publication Data

US 2011/0052183 A1 Mar. 3, 2011

Related U.S. Application Data

(63) Continuation-in-part of application No. 12/150,219, filed on Apr. 25, 2008, now Pat. No. 7,798,730, and a continuation-in-part of application No. 12/150,874, filed on Apr. 30, 2008, now Pat. No. 7,806,606.

(60) Provisional application No. 60/928,135, filed on May 7, 2007.

(51) Int. Cl.
G03B 9/00 (2006.01)
G03B 9/08 (2006.01)

(52) U.S. Cl. .......................... 396/458; 396/463; 396/467

(58) Field of Classification Search .................. 396/467, 396/471, 463, 458–461, 494, 493, 497–501, 396/505–510
See application file for complete search history.

(56) References Cited

U.S. PATENT DOCUMENTS

| 2,279,372 | A | 4/1942 | Herzberger | 88/57 |
| 3,087,384 | A | 4/1963 | Baur et al. | 88/57 |
| 3,599,377 | A | 8/1971 | Dartnell | 51/284 |
| 3,609,270 | A | 9/1971 | Jorgensen et al. | 200/67 |
| 4,257,086 | A | 3/1981 | Gulliksen | |
| 4,290,168 | A | 9/1981 | Binge | |
| 4,879,592 | A | 11/1989 | Ernest | 358/42 |

(Continued)

FOREIGN PATENT DOCUMENTS

CN 1846166 A 10/2006

(Continued)

OTHER PUBLICATIONS

"High Precision Optical Assembly Starts Here," (4 pages) Jan. 1996, Opto-Alignment Technology, Inc.

(Continued)

*Primary Examiner* — W. B. Perkey
*Assistant Examiner* — Noam Reisner
(74) *Attorney, Agent, or Firm* — Haverstock & Owens LLP

(57) ABSTRACT

A miniature camera module comprising: a module frame comprising a surface with a conduit passing through the surface, thereby allowing light to pass through the surface via the conduit; a first blade coupled to the module frame and configured to rotate about a first axis between an open position and a closed position, wherein the first blade does not eclipse the conduit at all when in the open position and the first blade at least partially eclipses the conduit when in the closed position; a first solenoid coupled to the module frame; and a first pin coupled to the first solenoid, wherein an actuation of the first solenoid causes the first pin to rotate the first blade from the open position to the closed position. In some embodiments, the module includes additional blades, solenoids and pins.

24 Claims, 17 Drawing Sheets

U.S. PATENT DOCUMENTS

| | | | | |
|---|---|---|---|---|
| 5,016,993 | A | 5/1991 | Akitake | 350/429 |
| 5,095,204 | A | 3/1992 | Novini | 250/223 B |
| 5,177,638 | A | 1/1993 | Emura et al. | 359/704 |
| 5,196,963 | A | 3/1993 | Sato et al. | 359/699 |
| 5,272,567 | A | 12/1993 | Inoue | 359/696 |
| 5,546,147 | A | 8/1996 | Baxter et al. | 354/187 |
| 5,689,746 | A | 11/1997 | Akada et al. | |
| 5,754,210 | A | 5/1998 | Haneda et al. | 347/116 |
| 5,805,362 | A | 9/1998 | Hayes | 359/819 |
| 5,835,208 | A | 11/1998 | Hollmann et al. | 356/124 |
| 5,926,965 | A | 7/1999 | Shijo et al. | 33/390 |
| 5,954,192 | A | 9/1999 | Iitsuka | 200/336 |
| 5,966,248 | A | 10/1999 | Kurokawa et al. | 359/697 |
| 6,091,902 | A | 7/2000 | Komatsuzaki et al. | 396/60 |
| 6,282,380 | B1 | 8/2001 | Yamamoto | |
| 6,292,306 | B1 | 9/2001 | Betensky | 359/663 |
| 6,330,400 | B1 | 12/2001 | Bittner et al. | 396/72 |
| 6,417,601 | B1 | 7/2002 | Kim | 310/333 |
| 6,530,703 | B2 | 3/2003 | Nakano et al. | |
| 6,597,516 | B2 | 7/2003 | Saitoh et al. | 359/694 |
| 6,682,161 | B2 | 1/2004 | Yun | |
| 6,760,167 | B2 | 7/2004 | Meehan et al. | 359/822 |
| 6,762,888 | B1 | 7/2004 | Oshima | 359/696 |
| 6,805,499 | B2 | 10/2004 | Westerweck et al. | 396/448 |
| 6,869,233 | B2 | 3/2005 | Westerweck et al. | 396/460 |
| 6,940,209 | B2 | 9/2005 | Henderson | 310/323.02 |
| 7,010,224 | B2 | 3/2006 | Nomura | 396/85 |
| 7,088,525 | B2 | 8/2006 | Finision et al. | 359/703 |
| 7,156,564 | B2 * | 1/2007 | Watanabe et al. | 396/463 |
| 7,193,793 | B2 | 3/2007 | Murakami et al. | 359/791 |
| 7,259,497 | B2 | 8/2007 | Sakano et al. | 310/323.02 |
| 7,301,712 | B2 | 11/2007 | Kamo | 359/785 |
| 7,330,648 | B2 | 2/2008 | Morinaga et al. | 396/144 |
| 7,379,112 | B1 | 5/2008 | Raad | |
| 7,394,602 | B2 | 7/2008 | Chen et al. | 359/785 |
| 7,400,454 | B2 | 7/2008 | Kubota et al. | 359/689 |
| 7,420,609 | B2 | 9/2008 | Yamaguchi et al. | 348/335 |
| 7,605,991 | B2 | 10/2009 | Chiang | |
| 7,670,067 | B2 * | 3/2010 | Utz | 396/452 |
| 7,675,565 | B2 | 3/2010 | Cheng | |
| 7,806,606 | B2 * | 10/2010 | Westerweck | 396/493 |
| 2002/0012066 | A1 | 1/2002 | Nagai | |
| 2002/0018140 | A1 | 2/2002 | Suemoto et al. | 348/358 |
| 2002/0102946 | A1 | 8/2002 | San Giovanni | 455/90 |
| 2002/0136556 | A1 | 9/2002 | Nomura et al. | |
| 2002/0142798 | A1 | 10/2002 | Miyake | |
| 2002/0144369 | A1 | 10/2002 | Biggs et al. | |
| 2003/0012573 | A1 * | 1/2003 | Sekizawa et al. | 396/463 |
| 2003/0174419 | A1 | 9/2003 | Kindler et al. | 359/819 |
| 2004/0017501 | A1 | 1/2004 | Asaga et al. | |
| 2004/0042780 | A1 | 3/2004 | Kindaichi et al. | |
| 2004/0042785 | A1 | 3/2004 | Watanabe et al. | |
| 2004/0042786 | A1 | 3/2004 | Watanabe et al. | |
| 2004/0056970 | A1 | 3/2004 | Westerweck et al. | 348/240.3 |
| 2004/0056974 | A1 | 3/2004 | Kitajima et al. | |
| 2004/0057720 | A1 | 3/2004 | Westerweck et al. | |
| 2004/0203532 | A1 | 10/2004 | Mizuta | 455/90.3 |
| 2004/0258405 | A1 | 12/2004 | Shiratori et al. | 369/458 |
| 2005/0014538 | A1 | 1/2005 | Hyun et al. | |
| 2005/0063698 | A1 | 3/2005 | Usuda et al. | |
| 2005/0157195 | A1 | 7/2005 | Ohashi et al. | |
| 2005/0162534 | A1 | 7/2005 | Higashiyama et al. | |
| 2005/0248684 | A1 | 11/2005 | Machida | |
| 2005/0264670 | A1 | 12/2005 | Yamaguchi et al. | 348/335 |
| 2006/0049720 | A1 | 3/2006 | Henderson et al. | 310/328 |
| 2006/0056389 | A1 | 3/2006 | Monk et al. | 370/352 |
| 2006/0083503 | A1 | 4/2006 | Fukai | |
| 2006/0103754 | A1 | 5/2006 | Wenstrand et al. | |
| 2006/0113867 | A1 | 6/2006 | Sakatani et al. | 310/323.17 |
| 2006/0124746 | A1 | 6/2006 | Kim et al. | |
| 2006/0209205 | A1 | 9/2006 | Tsai | |
| 2006/0261257 | A1 | 11/2006 | Hwang | |
| 2006/0291061 | A1 | 12/2006 | Iyama et al. | 359/614 |
| 2007/0053672 | A1 | 3/2007 | Westerweck et al. | 396/79 |
| 2007/0074966 | A1 | 4/2007 | Yamamoto et al. | 200/547 |
| 2007/0077051 | A1 | 4/2007 | Toor et al. | 396/144 |
| 2007/0077052 | A1 | 4/2007 | Chang | 396/144 |
| 2007/0086777 | A1 | 4/2007 | Fujita | 396/452 |
| 2007/0108847 | A1 | 5/2007 | Chang | |
| 2007/0122146 | A1 | 5/2007 | Ryu | 396/529 |
| 2007/0146489 | A1 | 6/2007 | Kosako et al. | |
| 2007/0147195 | A1 | 6/2007 | Morinaga | |
| 2007/0154198 | A1 | 7/2007 | Oh et al. | |
| 2007/0201866 | A1 * | 8/2007 | Kihara | 396/468 |
| 2007/0280667 | A1 | 12/2007 | Shin | |

FOREIGN PATENT DOCUMENTS

| | | |
|---|---|---|
| EP | 1 148 406 A2 | 10/2001 |
| EP | 1 148 406 A3 | 6/2002 |
| EP | 1 357 726 A1 | 10/2003 |
| GB | 1 375 515 | 12/1974 |
| GB | 2 315 186 A | 1/1998 |
| GB | 2 387 063 A | 10/2003 |
| JP | 402123335 A1 | 5/1990 |
| JP | 11-72678 | 3/1999 |
| JP | 2002-286987 | 10/2002 |

OTHER PUBLICATIONS

Non-Final Office Action dated Jun. 11, 2009, U.S. Appl. No. 12/287,469, filed Oct. 8, 2008, Lothar Westerweck, 11 pages.

Office Action regarding Chinese Patent Application No. 200680041383.0, Application Date: Sep. 5, 2006, date of Office Action: Dec. 18, 2009, 8 pages.

Office Action mailed Mar. 18, 2010, U.S. Appl. No. 12/150,219, 38 pages.

Office Action mailed Mar. 30, 2010, U.S. Appl. No. 12/150,874, 26 pages.

Notice of Allowance mailed Jul. 30, 2010, U.S. Appl. No. 12/150,219, filed Apr. 25, 2008, 10 pages.

Notice of Allownace mailed Aug. 2, 2010, U.S. Appl. No. 12/150,874, filed Apr. 30, 2008, 12 pages.

Office Action for Chinese application No. 200780047588.4, Application date: Dec. 21, 2007, Title of Invention; "Three-Element Photographic Objective with Reduced Tolerance Sensitivities". First Office Action, Date of Issue: Sep. 19, 2010, 12 pages, from State Intellectual Property Office, P.R. China.

China foreign office action dated Jan. 20, 2011, 1st office action regarding application No. 200880014860.3, 11 pages.

\* cited by examiner

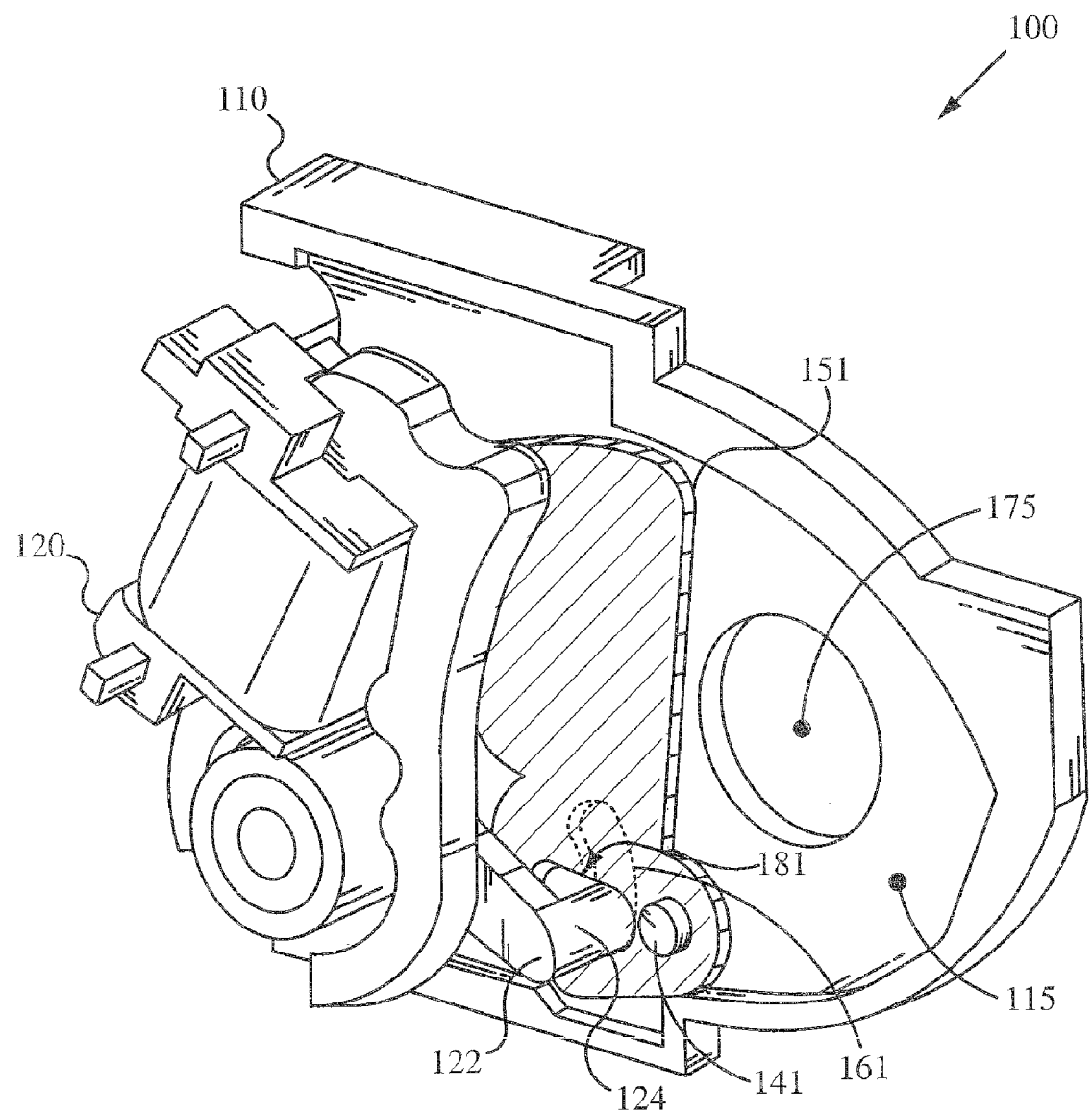
Fig. 1A
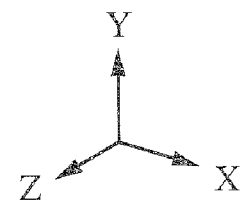

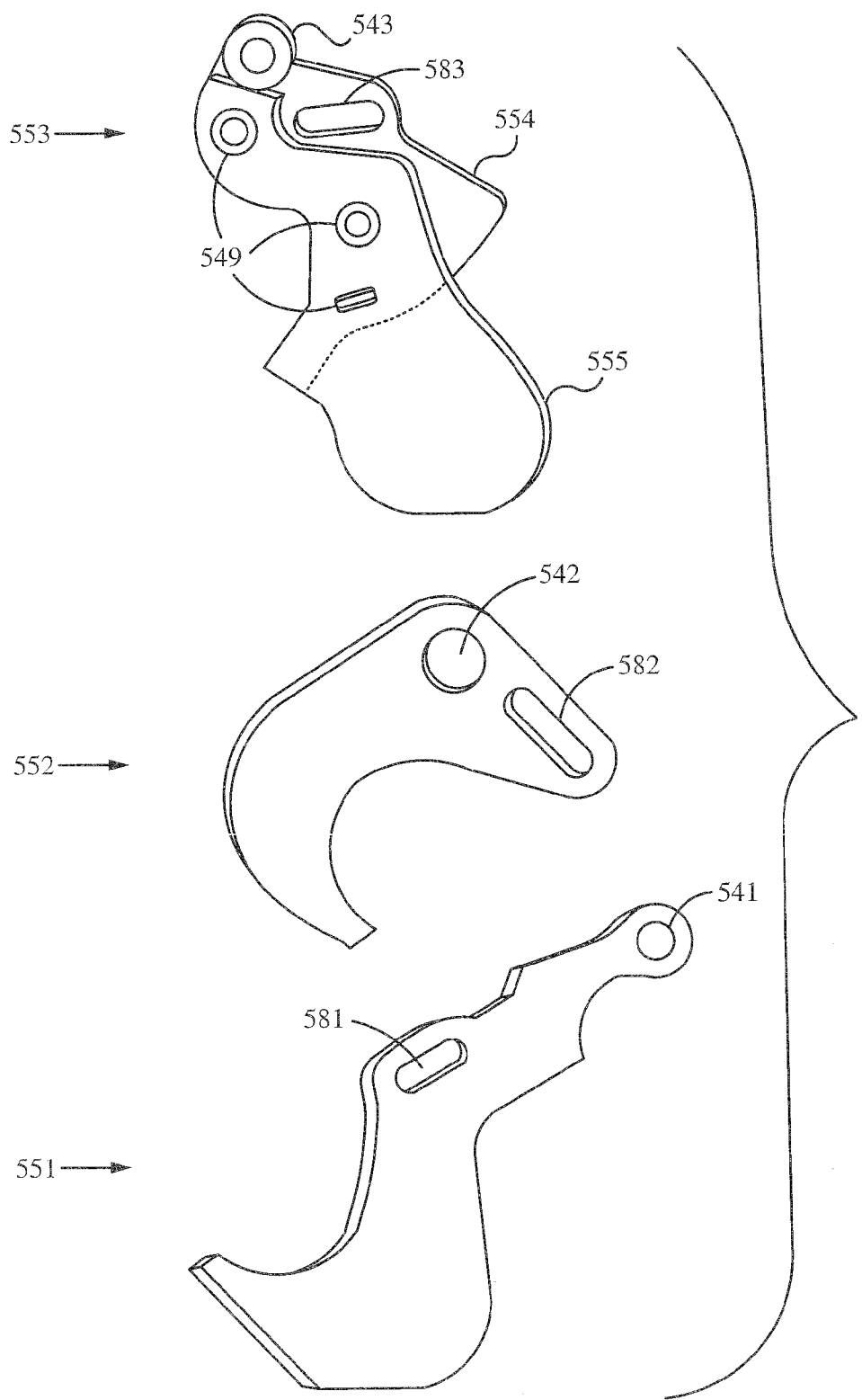

AF/ZOOM SHUTTER WITH TWO BLADES FUNCTION

RELATED APPLICATIONS

This patent application is a continuation-in-part of U.S. patent application Ser. No. 12/150,219, filed Apr. 25, 2008, entitled, "CAMERA BLADE SHUTTER MODULE," and U.S. patent application Ser. No. 12/150,874, filed Apr. 30, 2008, entitled, "MINIATURE CAMERA SHUTTER AND FILTER/APERTURE", both of which claim priority under 35 U.S.C. §119(e) of U.S. Provisional Patent Application Ser. No. 60/928,135, filed May 7, 2007, entitled, "MINIATURE CAMERA SHUTTER AND FILTER/APERTURE." U.S. patent application Ser. No. 12/150,219, filed Apr. 25, 2008, entitled, "CAMERA BLADE SHUTTER MODULE," U.S. patent application Ser. No. 12/150,874, filed Apr. 30, 2008, entitled, "MINIATURE CAMERA SHUTTER AND FILTER/APERTURE," and U.S. Provisional Patent Application Ser. No. 60/928,135, filed May 7, 2007, entitled, "MINIATURE CAMERA SHUTTER AND FILTER/APERTURE" are all hereby incorporated by reference in their entirety as if set forth herein.

FIELD OF THE INVENTION

The present invention relates generally to the field of image capture systems. More specifically, the present invention relates to shuttering, adjusting aperture size and filtering optical exposures in a camera system having restrictive size limitations.

BACKGROUND OF THE INVENTION

Cameras commonly include mechanical structures for shuttering light, adjusting an amount of light and adjusting the quality of light that is able to pass through to an imaging surface. The camera shutter is a device that alternatively allows light to pass through to an imaging surface for a certain period of time and blocks the light so as to limit the time light falls incident on the imaging surface. It is well known that it is advantageous to have the ability to control the shutter speed, or the time the imaging surface is exposed to light. A camera aperture is a device which can be used to limit the percentage of the total amount of incident light that is exposed to an imaging surface. For example, a smaller aperture lets less light onto the imaging surface so that bright images may be processed, whereas a larger aperture allows more light onto the imaging surface to expose darker images. It is also advantageous to control the quality of light falling incident upon an imaging surface by utilizing filters. For example, it may be desirable to reduce the intensity of the light passing through the aperture to an imaging surface. Neutral density filters reduce light of all relevant wavelengths from entering an imaging surface. Using a neutral density filter allows a user to reduce a portion of light while maintaining a constant aperture setting. Neutral density filters are particularly useful in preventing overexposure during bright conditions. Also, in some instances it is desirable to filter particular wavelengths of light. For example, ultraviolet filters are used to reduce haziness in images created by ultraviolet light. In other camera applications, color filters are used to compensate for the effects of lighting or for contrast enhancement.

Notwithstanding the advantages provided by utilizing shutters, apertures and filters in photography applications, they have not been successfully utilized in miniature camera applications such as cameras that are incorporated in cellular phones, personal digital assistant devices, and the like. The size limitations of known technology currently do not allow for the practical use of apertures and filters in such devices. For example, aperture size is traditionally adjusted manually and filters are traditionally placed manually onto a camera lens. However, this has traditionally been impracticable because the extremely small size of the lenses and imaging surfaces in miniature cameras prevent manual adjustment of the camera. Furthermore, it is not practicable to include multiple modules, each performing a separate function, to be positioned in-line within an optical train due to the extremely small space constraints in a miniature camera application.

SUMMARY OF THE INVENTION

The present invention is a single miniature camera module designed to fit into a miniature camera chassis, wherein the module gives the user the ability able to control the amount, quality and exposure time of light on a imaging surface in miniature camera applications. In certain applications more than one miniature camera module is used, wherein each module is smaller than traditional modules. Furthermore, a method of manufacturing a miniature camera module is disclosed which gives the user the ability able to control the amount, quality and exposure time of light on an imaging surface in miniature camera applications.

In some embodiments of the present invention, the miniature camera module comprises a conduit for the passage of light therethrough. At least one solenoid device is coupled to the frame and controllable by a user. The solenoid device causes at least one blade to at least partially eclipse the conduit upon actuation of the solenoid. In some embodiments of the present invention, the blade comprises a shutter to completely block light. In other embodiments, the blade comprises an aperture, a neutral-density filter, a monochromatic filter, or the like.

In some embodiments, a solenoid device disposed on one side of the frame is used to control at least one blade on the same side of the frame as the solenoid. In other embodiments, a solenoid controls at least one blade on the opposite side of the frame. In some embodiments of the present invention, one solenoid controls more than one blade upon actuation.

In some embodiments of the present invention, the module device comprises a frame with at least one solenoid device displaced on each side wherein each at least one solenoid has the ability to position a blade in front of the conduit. In some embodiments of the present invention, more than one solenoid is disposed on the same side of a frame and each control at least one blade.

According to some embodiments of the present invention, a number of shutters, apertures and filters, among other accessories, are able to be housed and are controllable on a single module frame. This eliminates the need to precisely align multiple modules. Furthermore, eliminating the need for multiple modules allows the overall camera chassis to be smaller.

In some embodiments of the present invention, the one or more blades used to shutter, aperture or filter light are configured with a unique geometry such that when a solenoid receives a signal from a user, only a slight movement of the solenoid arm is required to adequately achieve the desired result, thus allowing a smaller solenoid to be used. Smaller solenoids, in turn, allow the camera module of the present invention to be used in an extremely small camera chassis.

In some embodiments of the present invention, the miniature camera module is positioned within a more elaborate miniature camera chassis. In some embodiments of the present invention, the miniature camera module is positioned within the chassis of a cellular telephone having image recording capabilities or within other common consumer electronic devices now known or those developed in the future.

In one aspect of the present invention, a miniature camera module is provided. The miniature camera module comprises a module frame comprising a surface with a conduit passing through the surface, thereby allowing light to pass through the surface via the conduit. A first blade is coupled to the module frame and configured to rotate about a first axis between an open position and a closed position, wherein the first blade does not eclipse the conduit at all when in the open position and the first blade at least partially eclipses the conduit when in the closed position. A first solenoid is coupled to the module frame. A first pin is coupled to the first solenoid, wherein an actuation of the first solenoid causes the first pin to rotate the first blade from the open position to the closed position.

In some embodiments, the miniature camera module further comprises a blade channel disposed in the first blade, wherein the first pin extends at least partially into the blade channel such that the first pin moves within the blade channel and applies force to the first blade in response to the actuation of the first solenoid. In some embodiments, the miniature camera module further comprises a frame channel disposed in the module frame, wherein the first pin passes through the frame channel from one side of the module frame, on which the first solenoid is disposed, to an opposite side of the module frame, on which the first blade is disposed. The first pin moves within the frame channel in response to the actuation of the first solenoid.

In some embodiments, the first blade comprises a completely opaque shutter configured to completely obstruct light from passing through the conduit when the first blade is in the closed position. In some embodiments, the miniature camera module further comprises a second blade coupled to the module frame and configured to rotate about a second axis between an open position and a closed position, wherein the second blade does not eclipse the conduit at all when in the open position and the second blade at least partially eclipses the conduit when in the closed position. In some embodiments, the second blade comprises an aperture disposed on the surface of the second blade. The aperture has a smaller diameter than the conduit such that the second blade only partially obstructs light from passing through the conduit while the second blade is in the closed position. In some embodiments, the second blade comprises a filter coupled to the second blade such that the filter at least partially filters light from passing through the conduit while the second blade is in the closed position. In some embodiments, the filter is either a wavelength-specific filter configured to filter out a portion of light passing through the conduit that has a particular range of wavelengths or a neutral-density filter configured to filter all wavelengths of light passing through the conduit. In some embodiments, the miniature camera module comprises a second solenoid coupled to the module frame, and a second pin coupled to the second solenoid, wherein an actuation of the second solenoid causes the second pin to rotate the second blade from the open position to the closed position. In some embodiments, the first solenoid and the second solenoid are disposed on opposite sides of the module frame from one another, and the first blade and the second blade are disposed on opposite sides of the module frame from one another.

In some embodiments, the first blade comprises an aperture disposed on the surface of the first blade. The aperture has a smaller diameter than the conduit such that the first blade only partially obstructs light from passing through the conduit while the first blade is in the closed position.

In some embodiments, the first blade comprises a filter coupled to the first blade such that the filter at least partially filters light from passing through the conduit while the first blade is in the closed position. In some embodiments, the filter is either a wavelength-specific filter configured to filter out a portion of light passing through the conduit that has a particular range of wavelengths or a neutral-density filter configured to filter all wavelengths of light passing through the conduit.

In some embodiments, the miniature camera module further comprises a second blade coupled to the module frame and configured to rotate about a second axis between an open position and a closed position, wherein the second blade does not eclipse the conduit at all when in the open position and the second blade at least partially eclipses the conduit when in the closed position. The first blade and the second blade comprise completely opaque shutters, and the first blade and the second blade work together to completely eclipse the conduit upon actuation of the first solenoid.

In some embodiments, the first blade comprises a first blade channel, wherein the first pin extends at least partially into the first blade channel such that the first pin moves within the first blade channel and applies force to the first blade in response to the actuation of the first solenoid, and the second blade comprises a second blade channel, wherein the first pin extends at least partially into the second blade channel such that the first pin moves within the second blade channel and applies force to the second blade in response to the actuation of the first solenoid. The first blade channel and the second blade channel are configured such that the first pin effectuates movement of the first blade before effectuating movement of the second blade. In some embodiments, the second blade channel is a substantially straight pathway, and the second blade is configured such that the second blade channel is substantially parallel to the initial movement of the first pin when the second blade is in the open position and the movement of the first blade has been effectuated by the first pin in response to the actuation of the first solenoid.

In some embodiments, the miniature camera module further comprises a third blade coupled to the module frame and configured to rotate about a third axis between an open position and a closed position, wherein the third blade does not eclipse the conduit at all when in the open position and the third blade at least partially eclipses the conduit when in the closed position. A second solenoid is coupled to the module frame. A second pin is coupled to the second solenoid, wherein an actuation of the second solenoid causes the second pin to rotate the third blade from the open position to the closed position.

In some embodiments, the first solenoid and the second solenoid are disposed on the same side of the module frame as each other, and the first blade, the second blade, and the third blade are disposed on the same side of the module frame as each other. In some embodiments, the third blade comprises an aperture disposed on the surface of the third blade. The aperture has a smaller diameter than the conduit such that the third blade only partially obstructs light from passing through the conduit while the third blade is in the closed position. In some embodiments, the third blade comprises a filter coupled to the third blade such that the filter at least partially filters light from passing through the conduit while the third blade is in the closed position.

In some embodiments, the miniature camera module further comprises a miniature camera chassis comprising an enclosure with an opening configured to allow light to enter the miniature camera chassis, an optical train in line with the opening, the optical train comprising at least one lens for focusing the light entering the miniature camera chassis, and an imaging surface. The module frame is positioned between the optical train and the imaging surface such that at least a portion of the focused light passes through the conduit of the module frame and falls incident upon the imaging surface, thereby producing a recordable image.

In some embodiments, the conduit and a portion of the first blade each have a substantially rectangular shape.

In some embodiments, the module frame comprises a recessed area, and the first blade is configured to rotate between the open position and the closed position within the recessed area.

In another aspect of the present invention, a method of manufacturing a miniature camera module is provided. The method comprises providing a miniature camera chassis and a miniature camera module frame. The miniature camera chassis comprises an opening configured to allow light to enter the miniature camera chassis, a lens package, and an imaging surface. Providing the miniature camera module frame comprises forming a conduit passing through the miniature module frame such that light is able to pass therethrough, and coupling a first blade to the module frame, wherein the first blade is configured to rotate about a first axis between an open position and a closed position. The first blade does not eclipse the conduit at all when in the open position and the first blade at least partially eclipses the conduit when in the closed position. A first solenoid is coupled to the module frame and is configured to receive a signal. A first pin is coupled to the first solenoid such that an actuation of the first solenoid causes the first pin to rotate the first blade from the open position to the closed position. The miniature camera module frame is positioned between the opening and the imaging surface such that light entering the opening is directed through the conduit to the imaging surface. The miniature camera module is provided the ability to supply a signal to the first solenoid, wherein the signal actuates the first blade, causing the first blade to at least partially eclipse the conduit. The first blade alters the light passing through the conduit upon actuation of the first solenoid.

In some embodiments, the first blade completely obstructs the light passing through the conduit upon actuation of the first solenoid. In some embodiments, the first blade only partially obstructs the light passing through the conduit upon actuation of the first solenoid. In some embodiments, the first blade filters the light passing through the conduit upon actuation of the first solenoid. In some embodiments, the first blade has a substantially rectangular shape to accommodate miniature camera applications having a substantially rectangular imaging surface.

According to these embodiments, a user is able to control the amount, quality and exposure time of light on a imaging surface in miniature camera applications.

BRIEF DESCRIPTION OF THE DRAWINGS

FIG. 1A illustrates a schematic perspective view of a miniature camera module with a blade leaving a conduit unimpeded according to some embodiments of the present invention.

FIG. 5A illustrates a perspective schematic view of the blades used in a miniature camera module according to some embodiments of the present invention.

DETAILED DESCRIPTION OF THE INVENTION

Figure 1B:
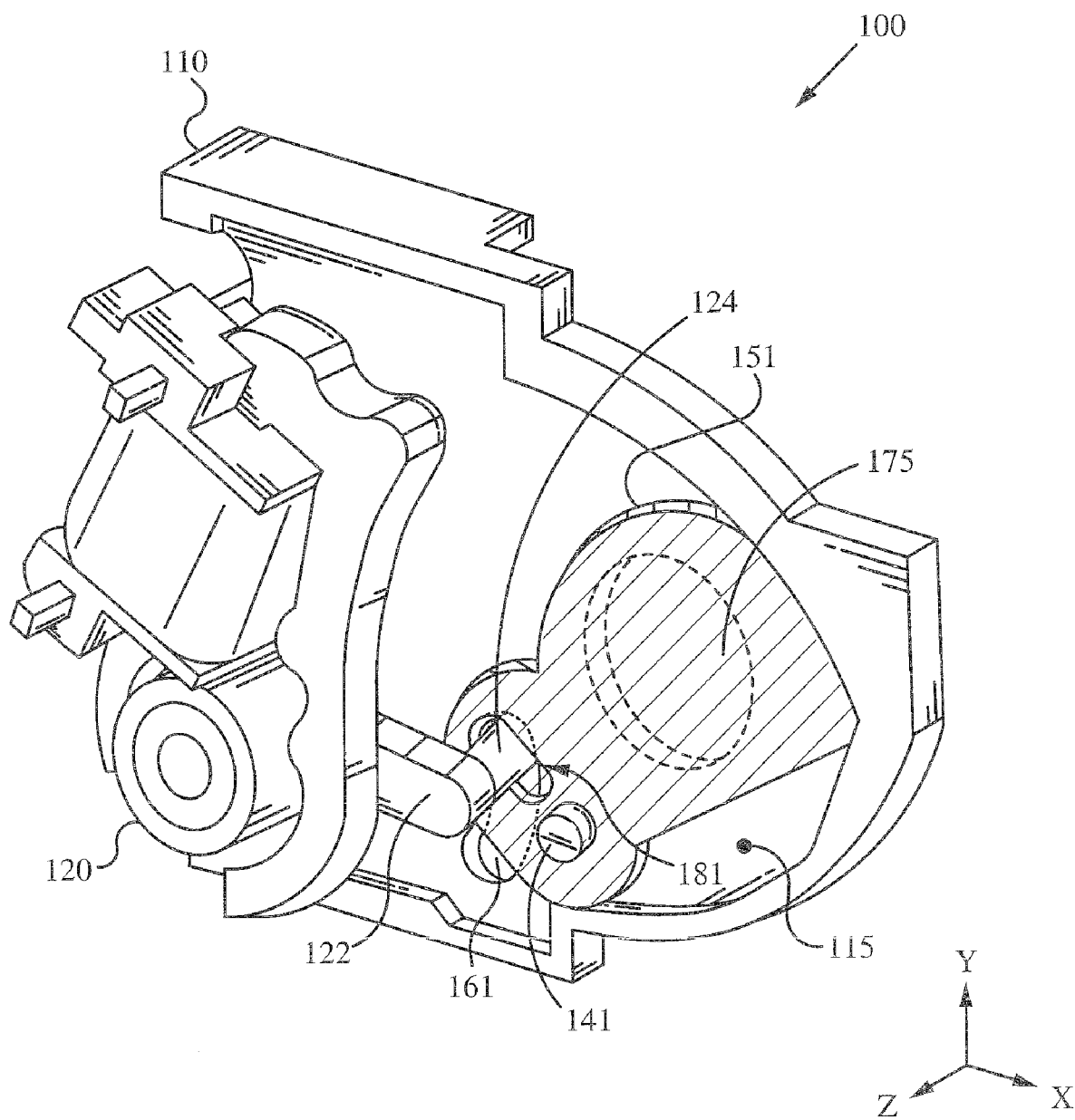
FIG. 1B illustrates a schematic perspective view of a miniature camera module with a blade impeding a conduit according to some embodiments of the present invention.

The following description is presented to enable one of ordinary skill in the art to make and use the invention and is provided in the context of a patent application and its requirements. Various modifications to the described embodiments will be readily apparent to those skilled in the art and the generic principles herein can be applied to other embodiments. Thus, the present invention is not intended to be limited to the embodiment shown, but is to be accorded the widest scope consistent with the principles and features described herein.

An improved apparatus and improved techniques are used for shuttering, creating and adjusting aperture size and filtering light in a miniature camera apparatus. Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

For the purpose of this disclosure, unless otherwise indicated expressly or impliedly by the context of the description, the term "conduit" shall mean an opening in a camera shutter module designed to allow the passage of light therethrough. Likewise, the term "aperture" shall mean an opening for allowing less than 100% of an amount of light through a conduit.

This disclosure provides several embodiments of the present invention. It is contemplated that any features from any embodiment can be combined with any features from any other embodiment, unless otherwise claimed. In this fashion, hybrid configurations of the illustrated embodiments are well within the scope of the present invention.

FIG. 1A illustrates a schematic perspective view of the first side of a camera module 100 according to some embodiments of the present invention. The camera module 100 comprises a module frame 110. A conduit 175 is disposed in and passes through the surface of the module frame 110, thereby allowing light to pass through the module frame 110 from one side to another. A first solenoid device 120 is coupled to the module frame 110. In some embodiments, the first solenoid device 120 comprises a transducer that converts an electric signal into a mechanical force. The first solenoid device 120 is coupled to a first arm 122 and a first pin 124. The mechanical force created by the first solenoid device 120 moves the first arm 122 and the first pin 124. The first pin 124 is functionally coupled to a first blade 151 such that movement of the first pin 124 physically manipulates the first blade 151. In some embodiments, which will be discussed in further detail below, this functional coupling and physical manipulation is achieved by disposing the first pin 124 at least partially through a groove or channel in the first blade such that the first pin 124 can interact with the first blade 151 when the first solenoid 122 is actuated.

In some embodiments of the present invention, the first blade 151 is coupled to the module frame 110 by an axis 141. In some embodiments, the first blade 151 is substantially disposed in the same plane as the module frame 110. According to these embodiments, the first solenoid device 120 receives an electric signal, then causes the first pin 124 to rotate the first blade 151 about the axis 141.

As shown, the first arm 122 extends from the first solenoid device 120 to a point over the first blade 151, and then the first pin 124 angles toward the first blade 151 and the module frame 110. In some embodiments, the first pin 124 extends towards the module frame 110 at an angle that is substantially perpendicular to the length of the first arm 122. In some embodiments of the present invention, a channel 161 (indicated with dashed lines) is disposed in the module frame 110 and the channel 161 guides the movement of the first pin 124, providing the first pin with a space and boundary within which to move. According to these embodiments, the first pin 124 passes through a channel 181 in the first blade 151 and fits within the channel 161 in the module frame 110, which guides the movement of the pin 124 as the solenoid device 120 moves the arm 122. The first pin 124, the first channel 161 and the first blade 151 are configured such that the first blade 151 alternatively eclipses the conduit 175 and leaves the conduit 175 un-impeded as the first solenoid 120 is switched. As shown, the first blade 151 is in the "open" position, meaning the first blade 151 is not eclipsing the conduit 175 in any way.

As illustrated in FIG. 1A, the first blade 151 is an opaque shutter. The opaque shutter completely blocks the conduit 175 when the first blade 151 is in a "closed" position (explained below). Although the first blade 151 is shown as a opaque shutter, it will be readily apparent to those having ordinary skill in the relevant art that the first blade 151 may comprise a number of camera accessories including, but not limited to: apertures, monochromatic filters and neutral-density filters, among others.

In operation, a user initiates a command to deliver an electric signal to the first solenoid device 120. The first solenoid device 120 actuates the first arm 122 and the first pin 124 such that the first blade 151 rotates about the axis 141. Since the orientation of the channel 161 on the module frame 110 and the orientation of the channel 181 on the first blade 151 are misaligned (e.g., substantially perpendicular to one another, with the length of the channel 161 extending substantially vertically and the length of the channel 181 extending substantially horizontally) when the first blade is in the "open" position, the first pin 124 interacts with the border of the blade channel 181 as it moves within the frame channel 161 and applies a mechanical force to the first blade 151. As the first blade 151 rotates about the axis 141, the conduit 175 becomes eclipsed. In some embodiments of the present invention, the solenoid device 120 automatically disengages the first arm 122 and the first pin 124 after a given time such that the first blade 151 re-opens the conduit 175. In other embodiments of the present invention, another electric signal must be delivered to the first solenoid device 120 in order to disengage first blade 151.

In some embodiments of the present invention, the module frame 110 is configured with a recessed area 115. The recessed area 115 has a surface area and thickness such that the first blade 151 is substantially housed within the recessed area 115 and does not protrude from the recessed area 115 during its movement. However, it will be readily apparent to those having ordinary skill in the art that the first blade 151, a second blade (not shown) or additional blades (not shown) can have a number of configurations, shapes, and positions in relation to the other components of the camera module while still achieving the objects of the present invention.

In some embodiments of the present invention, the module frame 110 is positioned within a camera chassis (not shown) which also contains the other necessary devices utilized in known methods of photography. According to these embodiments, the conduit 175 lines up with an imaging surface (not shown). In some embodiments of the present invention, the imaging surface is a photographic film or plate. In other embodiments of the present invention, the imaging surface is an array of charge-coupled devices (CCD) or CMOS sensors. However, it will be readily apparent to those having ordinary skill in the relevant art that any imaging surface can be used in conjunction with the present invention.

FIG. 1B illustrates a schematic perspective view of the camera module 100 shown in 1A, with the first blade 151 in a "closed" position, covering the conduit 175 (indicated with dashed lines). As shown in FIG. 1B, the first solenoid device 120 is coupled to the module frame 110, the first arm 122 extends from the first solenoid device 120 to a point over the first blade 151, and then the first pin 124 extends toward the module frame 110. The first pin 124 passes through the first blade 151 and fits within a channel 161 (partially indicated with dashed lines). Upon actuation of the first solenoid device 120, the first pin 124 moves from the lower part of the channel 161 to the upper part of the channel 161, thus rotating the first blade 151 about the axis 141 and eclipsing the conduit 175. As shown, the first blade 151 remains within the recessed area 115 during its movement.

Figure 2A:
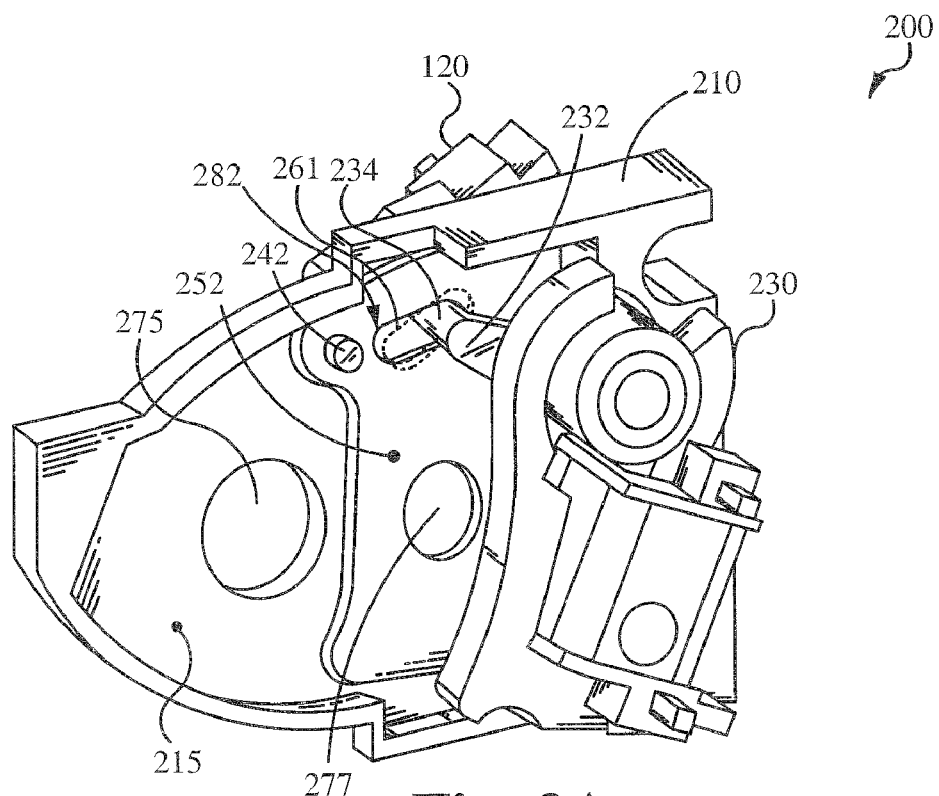
FIG. 2A illustrates a schematic perspective view of a miniature camera module with more than one solenoid and an aperture blade leaving a conduit unimpeded according to some embodiments of the present invention.
Figure 2B:
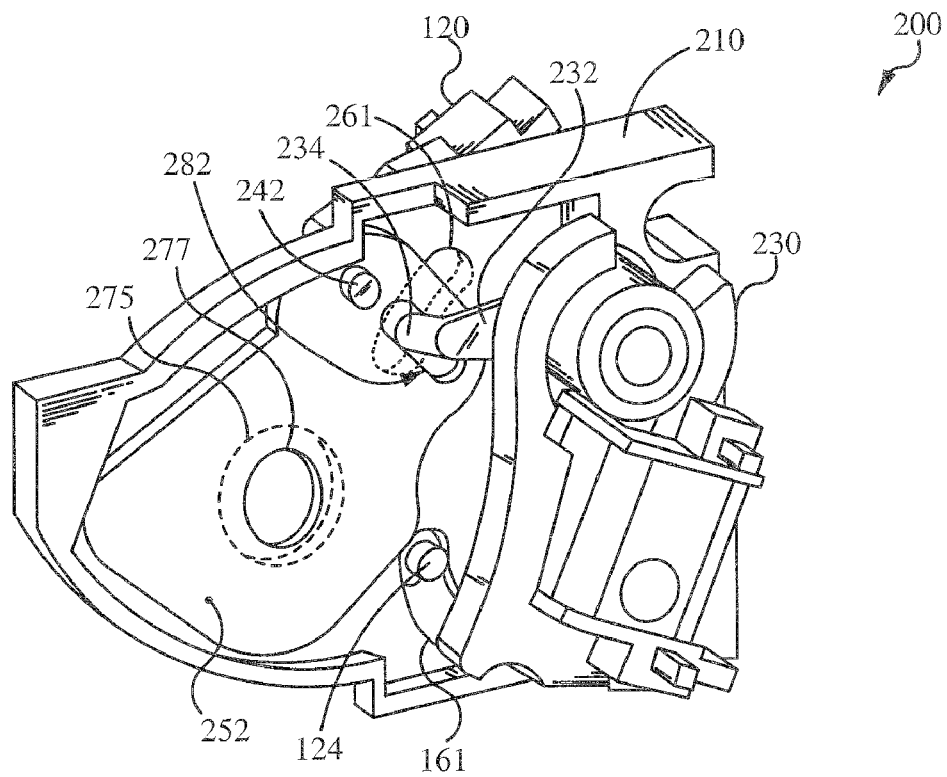
FIG. 2B illustrates a schematic perspective view of a miniature camera module with more than one solenoid and an aperture blade partially covering a conduit according to some embodiments of the present invention.

In some embodiments of the present invention, more than one solenoid device is disposed on a module frame in order to manipulate blades. FIGS. 2A-B illustrate a schematic perspective view of the miniature camera module 200 with multiple solenoid devices 120 and 230 according to some embodiments of the present invention. The miniature camera module 200 illustrated in FIGS. 2A-B is a modification of the miniature camera module 100 illustrated in FIGS. 1A-B. As such, the camera module 200 contains a first solenoid 120 coupled to the module frame 210. The first solenoid 120 moves a first arm (not shown) and a first pin 124 in a first channel 161 to manipulate a first blade (not shown). Additionally, a second solenoid device 230 is coupled to the opposite side of the module frame 210.

Camera module 200 comprises a second blade 252 coupled to the module frame 210. The configuration and manipulation of the second blade 252 is similar to that of the first blade 151 discussed above. A second arm 232 extends from the second solenoid device 230 to a point over the second blade 252, and then a second pin 234 angles toward the module frame 210. In some embodiments of the present invention, the second pin 234 passes through a channel 282 in the second blade 252 and fits within the channel 261 (indicated with dashed lines) in the module frame 210. The channel 261 in the module frame 210 guides the movement of the second pin 234.

In some embodiments, the second solenoid device 230 comprises a transducer which converts an electric signal into a force in order to move the second arm 232 and the second pin 234, thus manipulating the second blade 252. The second blade 252 is coupled to the module frame 210 by an axis 242 and is able to rotate about the axis 242 as the second arm 232 and a second pin 234 move. As such, the second blade 252 alternatively eclipses a conduit 275 in the module frame 210 and leaves the conduit 275 un-impeded.

FIG. 2A shows the second blade 252 in the "open" position, meaning the second blade 252 is not eclipsing the conduit 275. As shown, the second blade 252 is an aperture blade, which comprises an aperture 277 in the second blade 252. The aperture 277 is a conduit which is at least partially smaller than the conduit 275 and at least partially blocks the conduit 275 when the second blade 252 is in a "closed" position, as illustrated in FIG. 2B discussed below.

Although the second blade 252 is shown as an aperture blade, the second blade 252 may comprise a number of camera accessories including, but not limited to: shutters, monochromatic filters and neutral-density filters, dynamic radius apertures, among others.

As shown, the first solenoid 120 is configured such that the first pin 124 passes through the module frame 210 near the bottom of the module frame 210 and the second solenoid 230 is configured such that the second pin 234 passes through the module frame 210 near the top of the module frame 210. Such a configuration allows both the first solenoid 120 and the second solenoid 230 to effectuate the full range of blade motion without interfering with each other. As such, this configuration avoids the need to use multiple modules within a camera chassis to achieve the same results therefore achieving one object of the present which is to maintain a very small size camera module.

In some embodiments of the present invention, the module frame 210 is configured with a recessed area 215. The recessed area 215 has a surface area and thickness such that the second blade 252 is housed within the recessed area 215 and does not protrude from the recessed area 215 during its movement. However, it will be readily apparent to those having ordinary skill in the art that second blade 252 or additional blades (not shown) can have a number of configurations, shapes, and positions in relation to the other components of the camera module while still achieving the objects of the present invention.

In operation, a user initiates a command to send an electric signal to the second solenoid device 230. The second solenoid device 230 moves the second pin 234 from the upper part of the channel 261 to the lower part of the channel 261, causing the second pin 234 to apply a force on the second blade 252 via the blade channel 282, and thus rotating the second blade 252 about the axis 242. As the second blade 252 rotates about the axis 242, the conduit 275 becomes at least partially eclipsed. In some embodiments of the present invention, the second solenoid device 230 automatically disengages the second arm 232 and the second pin 234 such that the second blade 252 re-opens the full aperture size of conduit 275. In other embodiments of the present invention, another electrical signal must be delivered to the second solenoid device 230 in order to disengage second blade 252.

In some embodiments of the present invention, one signal effectuates actuation of both solenoids 120 and 230. In certain embodiments, one signal effectuates a staggered movement of the blades 151 and 252. In other embodiments, one signal effectuates simultaneous movement of blades 151 and 252.

FIG. 2B illustrates the miniature camera module 200 with the blade 252 in a "closed" position. As shown, the second arm 232 has been actuated, moving the second pin 234 from the top part of the channel 261 to the lower part of the channel 261, thus effectuating rotation of the second blade 252 about the axis 242. In the "closed" position, the second blade 252, acting as an aperture blade, partially eclipses the conduit 275, leaving only an opening the size of the smaller aperture 277. Also visible in FIG. 2B is the first channel 161. As shown, the first channel 161 contains the first pin 124.

Figure 3A:
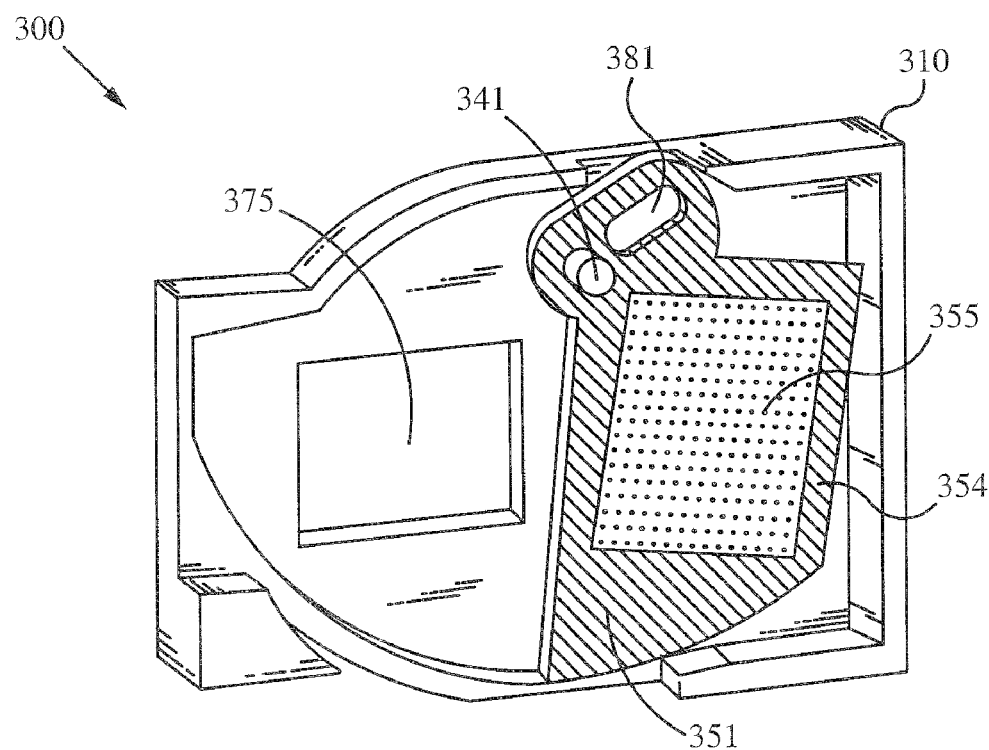
FIG. 3A illustrates a schematic perspective view of an alternative miniature camera module with a blade frame and a filter leaving a conduit unimpeded according to some embodiments of the present invention.
Figure 3B:
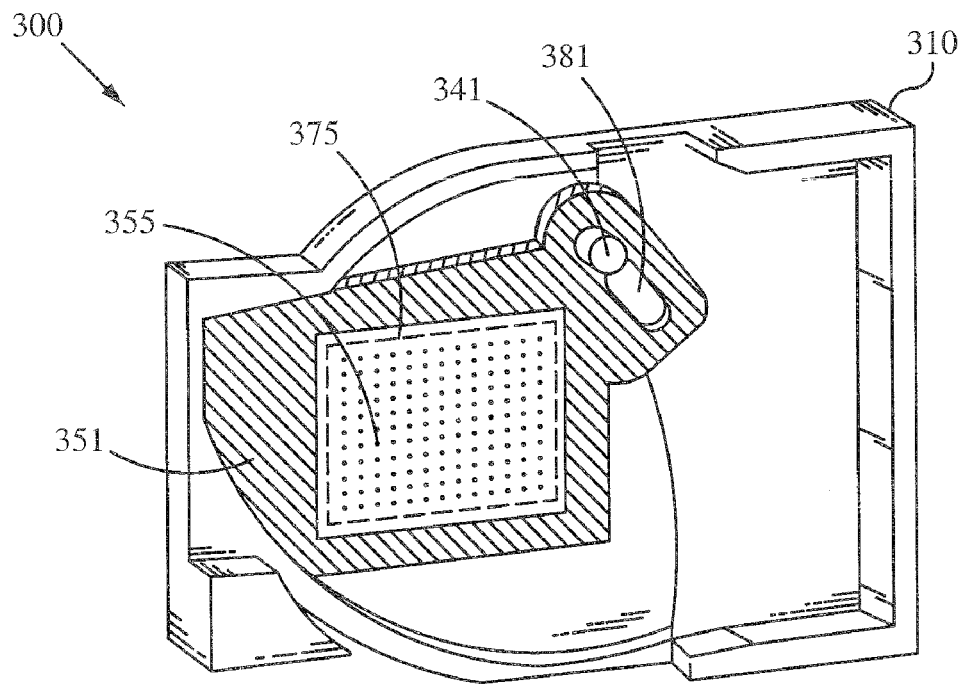
FIG. 3B illustrates a schematic perspective view of an alternative miniature camera module with a blade frame and a filter impeding a conduit according to some embodiments of the present invention.

FIGS. 3A-B illustrate an alternative embodiment of a miniature camera module 300 according to some embodiments of the present invention. The camera module 300 comprises a module frame 310, a blade 351 rotatably coupled to the module frame 310 via an axis 341, and a conduit 375 disposed on and passing through the module frame 310. A solenoid device (not shown) is disposed on the other side of the module frame 310. The solenoid device is coupled to an arm (not shown) and a pin (not shown). The module frame 310 is also configured with a channel (not shown) passing through its surface. The blade 351 is configured with a guide 381.

The configuration and manipulation of the blade 351 is similar to that of the first blade 151 and the second blade 252 discussed above with respect to FIGS. 1A-2B. Similar to the arm, pin, and channel configurations discussed above for FIGS. 1A-2B, the guide 381 and the channel in FIGS. 3A-B direct the movement of the arm and pin. When the solenoid device is actuated, the arm moves the pin through the channel and exerts a force on the border of the guide 381, causing the blade 351 to at least partially eclipse the conduit 375.

In some embodiments of the present invention, the blade 351 comprises a blade frame 354 housing a filter 355. A blade frame 354 is useful in housing the filter 355 because filters are often times too brittle to couple directly to the arm and the pin without becoming damaged after repeated movement of the parts.

The blade 351, filter 355, and conduit 375 shown in FIGS. 3A-B are shown to be substantially rectangular in shape. This configuration accommodates those miniature camera applications having a substantially rectangular imaging surface.

In some embodiments of the present invention, the filter 355 is a neutral-density filter. A neutral-density filter filters out equal portions of a wide range of wavelengths of light passing therethrough. In other embodiments of the present invention, the filter 355 is a monochromatic filter or wavelength-specific filter. Monochromatic filters filter out light having a small range of wavelengths. Although neutral-density filters and monochromatic filters are specifically disclosed, any appropriate filter is equally envisioned.

In some embodiments of the present invention, the module frame 310 is positioned within a camera chassis (not shown). According to these embodiments, the conduit 375 lines up with an image imaging surface (not shown). In some embodiments of the present invention, the imaging surface is a photographic film or plate. In other embodiments of the present invention, the imaging surface is an array of charge-coupled devices (CCD) or CMOS sensors. However, it will be readily apparent to those having ordinary skill in the art that any imaging surface can be used in conjunction with the present invention. The camera chassis also contains the other necessary devices utilized in known methods of photography. The camera module 300 depicted in FIG. 3A is in an "open" position. When the blade 351 is in an "open" position, the conduit 375 remains un-impeded by the blade 351. As such, light incident on the conduit 375 is not altered by the blade 351.

FIG. 3B illustrates the alternative miniature camera module 300 with the blade 351 in a "closed" position. The blade 351 is moved to a "closed" position over the conduit 375 (indicated by dashed lines) by a solenoid device (not shown). As such, light falling incident on the conduit is filtered by the filter 355. In some embodiments of the present invention, additional solenoid devices (not shown) and/or additional blades (not shown) are positioned on camera module 300.

Figure 4A:
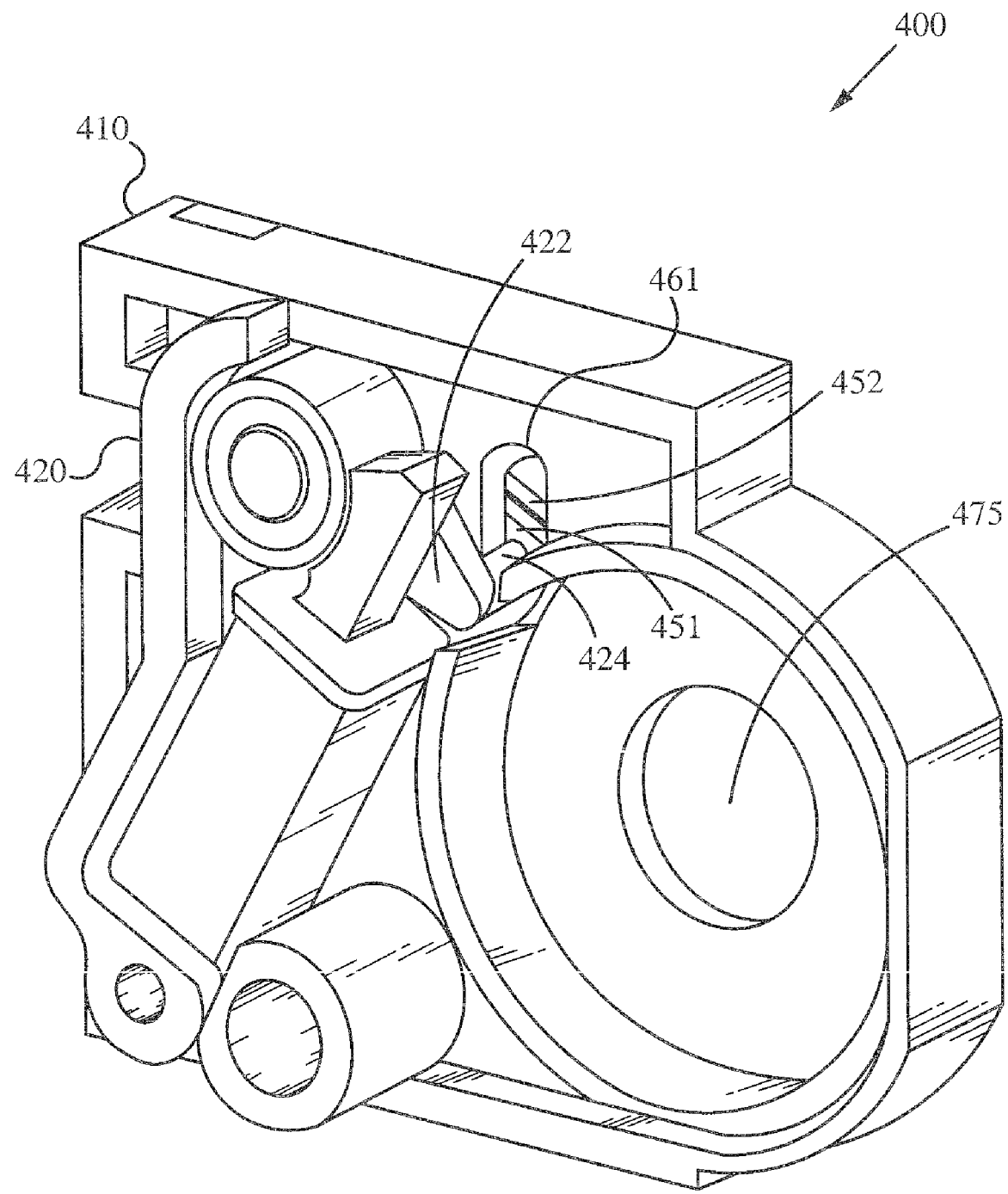
FIG. 4A illustrates a schematic perspective view of the solenoid side of a miniature camera module with a solenoid on one side of the frame and multiple blades on the other side of the module frame according to some embodiments of the present invention.

In some embodiments of the present invention, at least one solenoid device is located on one side of a module frame and the at least one solenoid device controls at least one blade on the opposite side of the module frame. FIG. 4A illustrates a schematic perspective view of a camera module device 400 with a solenoid device 420 located on one side of a module frame 410. The module frame 410 is configured with a conduit 475 on its surface such that light from a light source is able to pass therethrough. The solenoid device 420 is coupled to an arm 422 and a pin 424. A channel 461 is disposed on the module frame 410 and the pin 424 is configured to pass through a channel 461 to the other side of the module frame 410. On the opposite side of the module frame 410, the pin 424 is functionally coupled to at least one blade 452. In some embodiments of the present invention, the pin 424 is coupled to one or more additional blades (not shown). Upon actuation, the solenoid device 420 moves the pin 424 from the lower part of the channel 461 to the upper part of the channel 461.

Figure 4B:
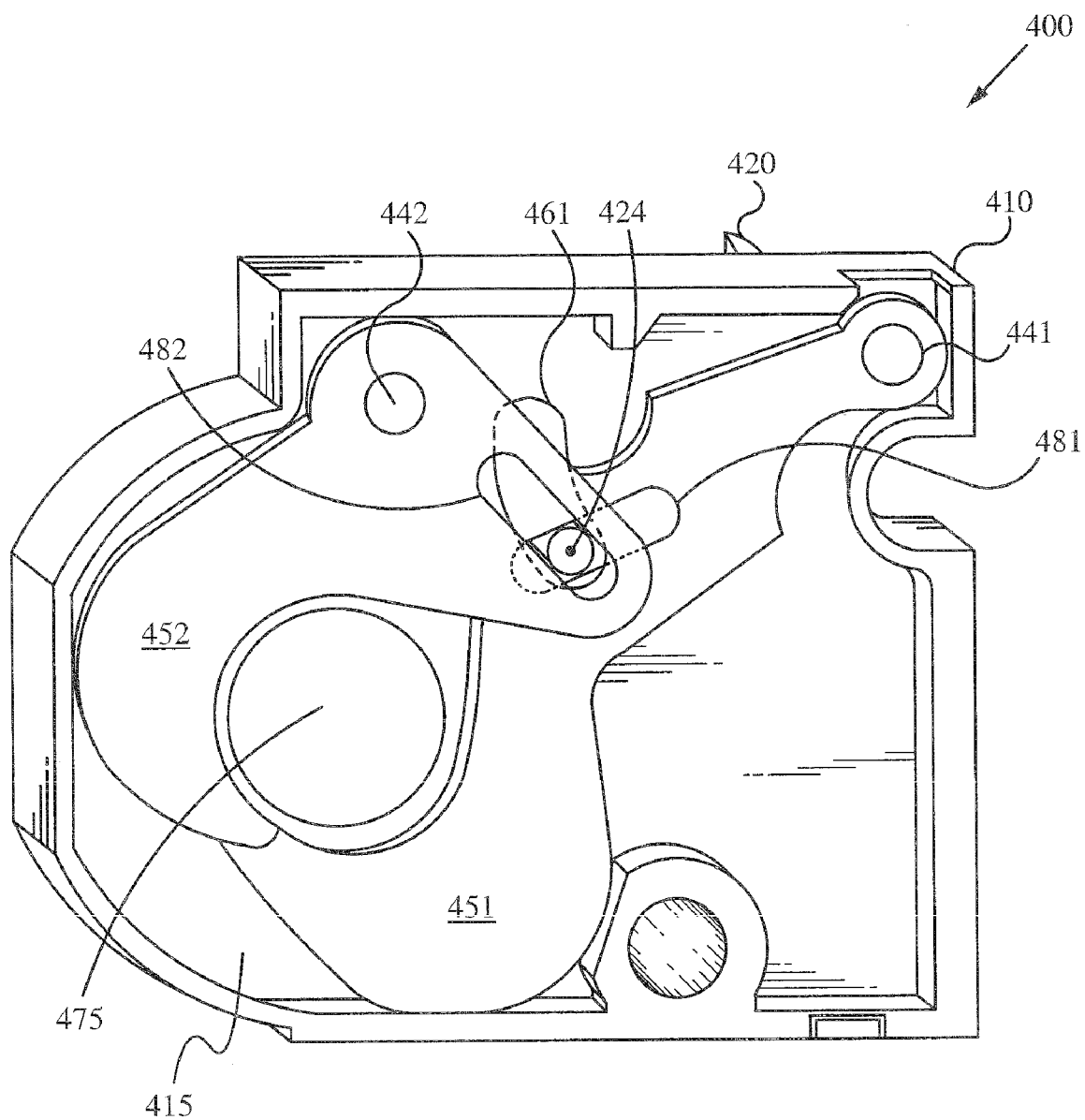
FIG. 4B illustrates a schematic perspective view of the blade side of a miniature camera module with a solenoid on one side of the frame and multiple blades on the opposite side of the frame according to some embodiments of the present invention.

FIG. 4B illustrates a schematic perspective view of the opposite side of the camera module 400 as illustrated in FIG. 4A. FIG. 4B shows the top corner of a solenoid device 420 coupled to the side of the module frame 410 illustrated in FIG. 4A. As explained above, the solenoid device 420 is coupled to an arm 422 (not shown in FIG. 4B) and a pin 424 which extends into the channel 461 (partially indicated with dashed lines). The pin 424 further extends into guides 481 and 482 (partially indicated with dashed lines), which are located on blades 451 and 452, respectively. Guides 481 and 482 are channels similar to channels 181 and 282 discussed above.

Blade 451 is coupled to the module frame 410 via axis 441 and the blade 452 is coupled to the module frame 410 via axis 442. As shown, the two blades 451 and 452 are configured such that when the solenoid device 420 is actuated and the pin 424 moves in the channel 461, the pin 424 exerts a force on the guides 481 and 482, causing the blade 451 to move in a clockwise direction and causing the blade 452 to move in a counter-clockwise direction. As such, blade 451 moves under blade 452 so as not to impede the movement of the blade 452. As such, the blades 451 and 452 simultaneously eclipse the conduit 475 upon actuation of the solenoid device 420. FIG. 4B shows the pin 424 having already begun to move up the channel 461 and the guide 482, yet neither blade 451 or 452 has begun to eclipse the conduit 475.

Figure 4C:
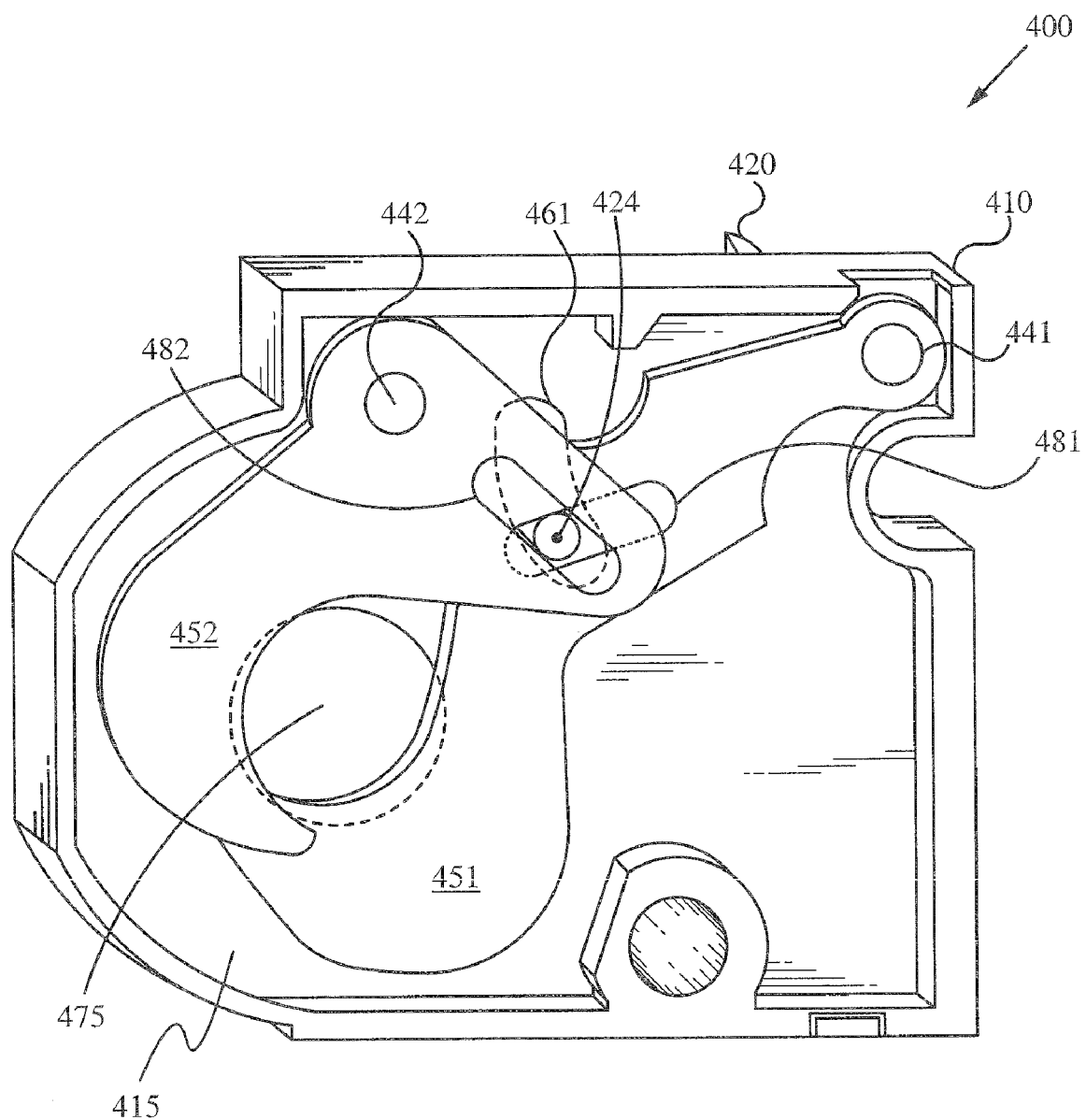
FIG. 4C illustrates a schematic perspective view of a miniature camera module with multiple blades at the initial stage of shuttering a conduit according to some embodiments of the present invention.
Figure 4D:
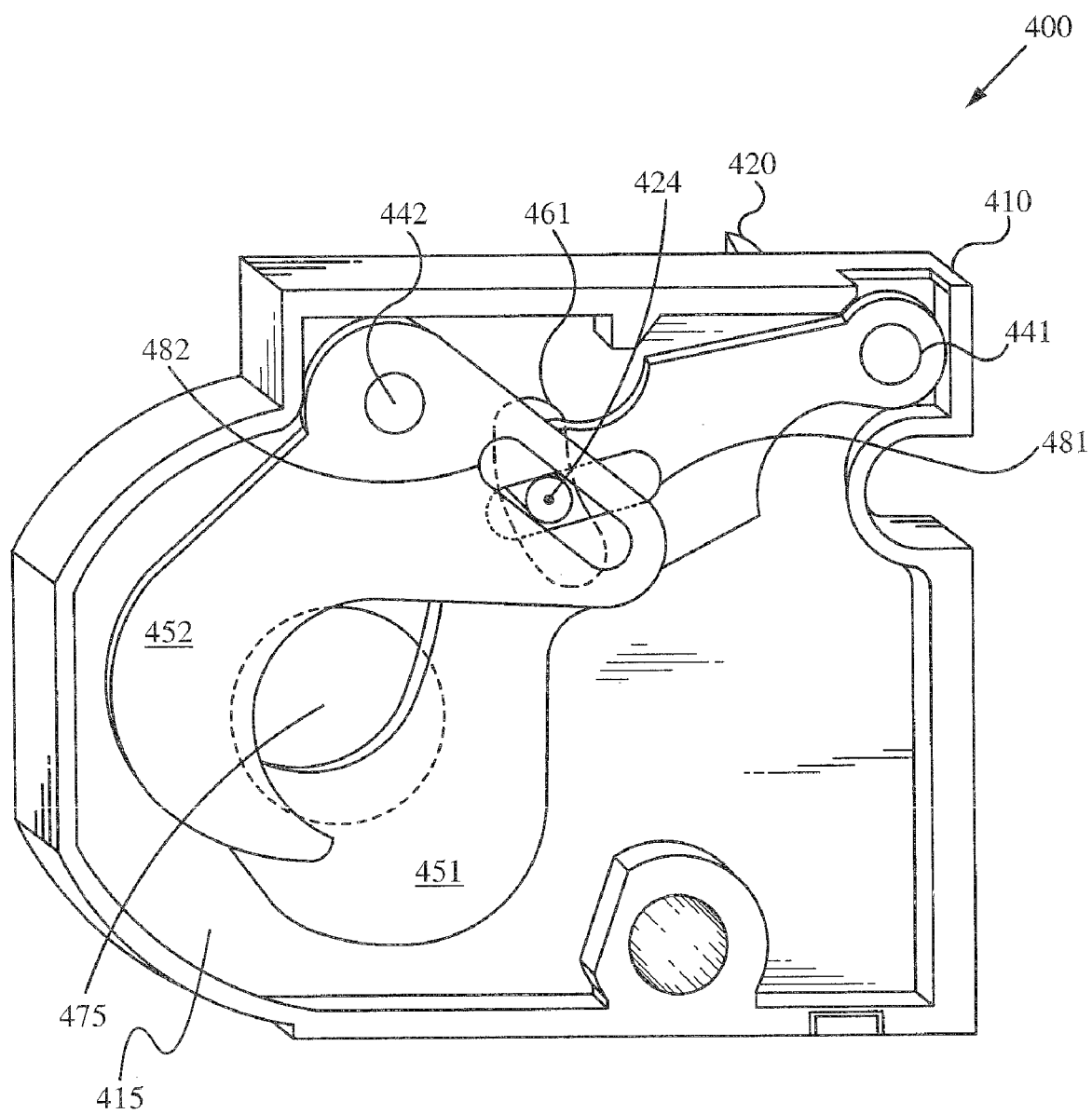
FIG. 4D illustrates a schematic perspective view of a miniature camera module with multiple blades at the middle stage of shuttering a conduit according to some embodiments of the present invention.
Figure 4E:
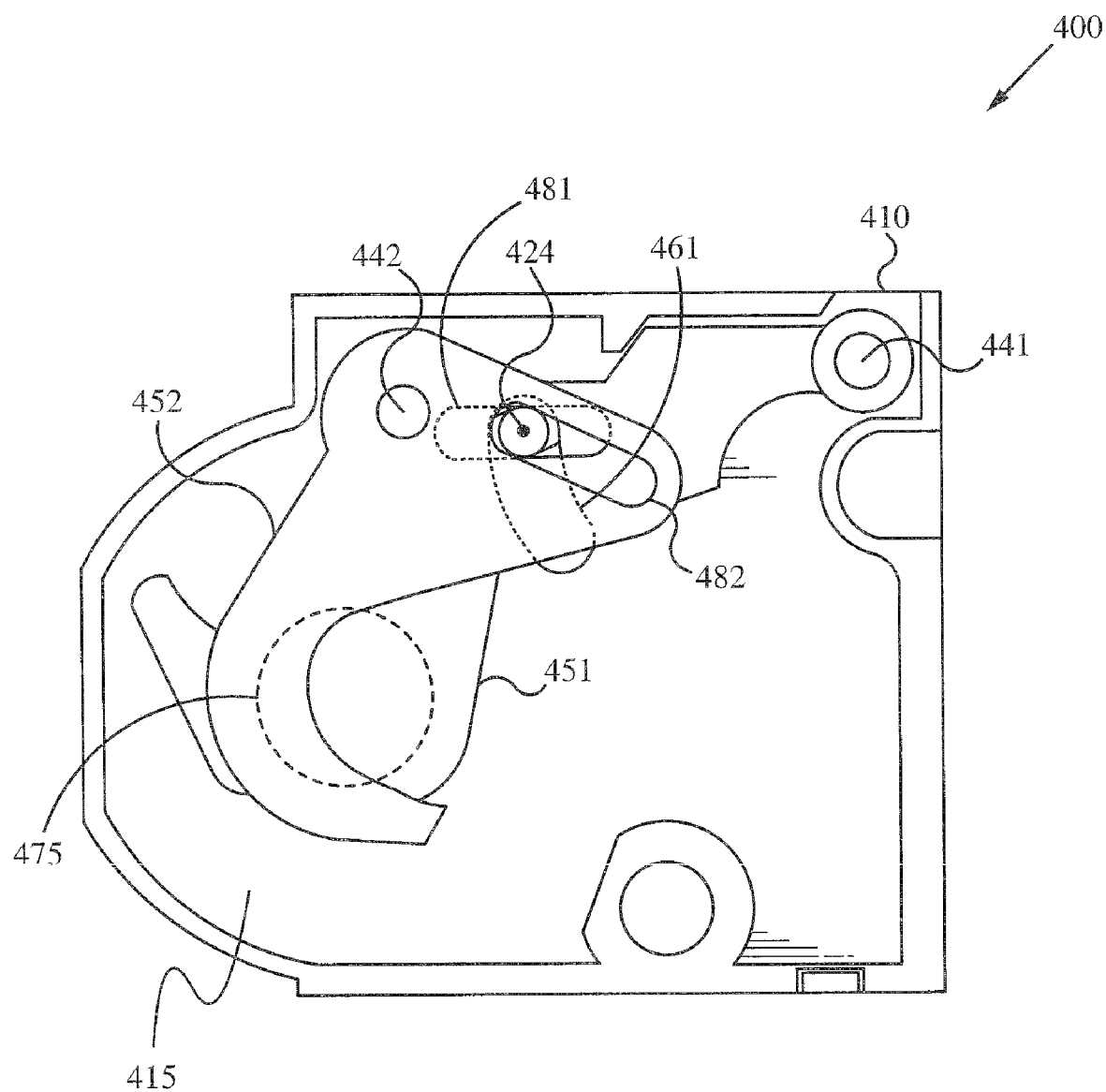
FIG. 4E illustrates a schematic side view of a miniature camera module with multiple blades at the completed stage of shuttering a conduit according to some embodiments of the present invention.

FIGS. 4C-4E illustrates the camera module 400 with the blades 451 and 452 at the initial, middle, and completed stages, respectively, of eclipsing the conduit 475. As shown, the blades 451 and 452 combine to completely eclipse the conduit 475 (indicated with dashed lines). The configuration of the blades 451 and 452 as well as the guides 481 and 482 help achieve an object of the present invention, which is to minimize the size of the module 400, while retaining full functionality of the blades. The size of the module 400 is minimized, in part, because a smaller movement of the pin 424 is required to fully eclipse the conduit 475 than would normally be needed if only one blade were used. By requiring a shorter movement of the pin 424, a smaller solenoid 420 is able to be used, thus enabling a smaller module package.

Furthermore, the unique geometry of the guides 481 and 482 limit the amount of work required of the solenoid 420. As shown in FIG. 4B, the pin 424 effectuates movement of the blade 451 first because the guide 481 is initially substantially perpendicular to the movement of the pin 424 through the channel 461 and because the pin 424 does not substantially interact with the guide 482 until the pin 424 is well into its movement, such as in FIG. 4C. In some embodiments, the blades 451 and 452, the guides 481 and 482, the pin 424, and the channel 461 are configured such that the arc motion of the pin 424 runs substantially parallel to the length of the guide 482 of blade 452 for a significant beginning portion of the total motion of the pin 424, thereby delaying the pin 424 from applying mechanical force to the second blade 452. As such, the amount of work required by the solenoid 420 is spread out. In some embodiments, the arc motion of the pin 424 runs substantially parallel to the length of the guide 482 of blade 452 for approximately 22 percent of the total motion of the pin 424.

Likewise, less work is required to move two, less massive blades than one larger, more massive blade. Therefore, the power required by the arm and pin 424 is less than would be required if one larger blade were used to effectuate an eclipse of the conduit 475. The unique configuration of the guides 481 and 482 and channel 461 helps reduce the amount of work required from the solenoid 420, thus enabling the module designer the option of using a smaller solenoid. As such, this improvement helps reduce the overall size of the camera module 400. Additionally, two smaller blades are able to eclipse a conduit faster than if one larger blade is used. As such, the present invention can be configured to optimize shutter speeds.

In some embodiments of the present invention, the miniature camera module has a substantially rectangular shape and has height and width dimensions from 5 millimeters to 10 millimeters, and has a conduit radius of approximately 1 millimeter. In other embodiments of the present invention, miniature camera module frames are custom-made for any given miniature camera applications. In some embodiments, the radius of the conduit in the module frame is either approximately 2.2 millimeters, approximately 2.6 millimeters, or approximately 3.5 millimeters.

In FIG. 4D the first blade 451 and the second blade 452 are at the middle stage of shuttering the conduit 475. Eventually, the movement of the first pin 424 within the channel 461 and the guides 481 and 482 comes to an end, as seen in FIG. 4E where the blades 451 and 452 are at the completed stage of shuttering the conduit 475.

In some embodiments of the present invention, the blades 451 and 452 are opaque surfaces. Opaque blades serve as a shutter to completely block light from passing through the conduit 475 upon actuation of the solenoid device 420 which causes a total eclipse the conduit 475. In FIG. 4E, blades 451 and 452 work together to completely block any light from passing through the conduit 475.

In other embodiments, the blades 451 and 452 are opaque, but only partially eclipse the conduit 475. According to these embodiments, the two blades serve as an aperture blade to partially block out light. In other embodiments of the present invention, the blades 451 and 452 contain filters to filter light when in the blades 451 and 452 eclipse the conduit 475.

Figure 5B:
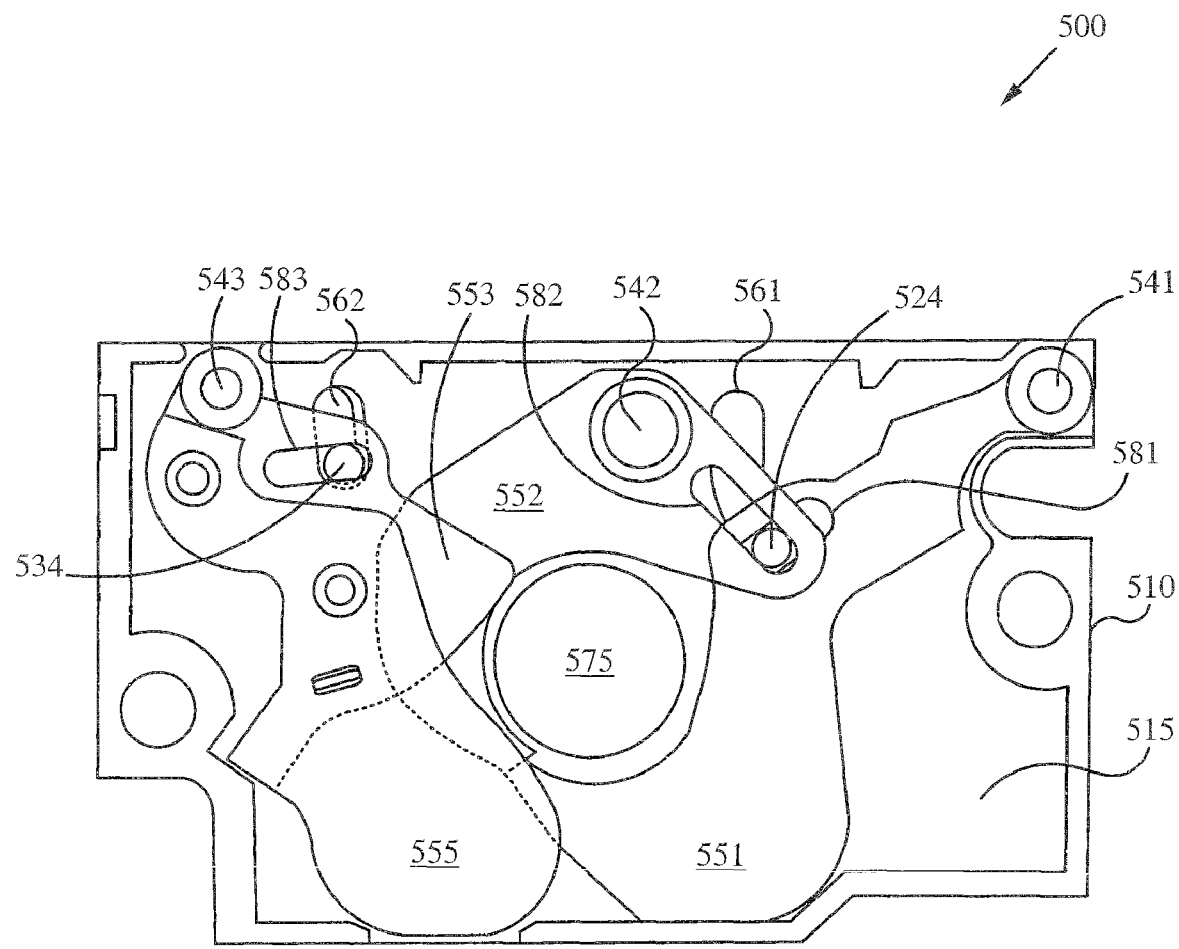
FIG. 5B illustrates a schematic side view of a miniature camera module with a filter blade and two shuttering blades according to some embodiments of the present invention.

FIGS. 5A-5E illustrate features of a miniature camera module 500 according to some embodiments of the present invention. FIG. 5A illustrates a perspective schematic view of blades 551, 552 and 553 used in the embodiments of the present invention illustrated in FIGS. 5B-5E. The blade 553 (partially indicated with dashed lines) comprises a holding blade 554 with an axis 543 and a channel 583 passing through the surface of the blade 554. Furthermore, a filter 555 is coupled to the top of blade 554 via couplings 549. It is sometimes desirable to couple a filter to a blade instead of only using a filter because certain filters are configured from material too brittle to be coupled to an axis or to a pin directly without damaging the filter upon actuation of the solenoid. However, those with ordinary skill in the relevant art will appreciate that a filter is able to, by itself, be used in certain applications.

In some embodiments of the present invention, the filter 555 is a neutral-density filter. A neutral-density filter filters out equal portions of a wide range of wavelengths of light passing therethrough. In other embodiments of the present invention, the filter 555 is a monochromatic filter. Monochromatic filters filter out light having a small range of wavelengths. Although neutral-density filters and monochromatic filters are specifically disclosed, any appropriate filter is equally envisioned.

The blades 551 and 552 each have an axis 541 and 542, respectively, and the blades 551 and 552 each have a channel 581 and 582, respectively, wherein the channels are used to guide the movement of the blades 551 and 552.

FIGS. 5B-5E show a miniature camera module 500 utilizing multiple blades. In FIG. 5B, the multiple blades 551, 552 and 553 are coupled to one side of the module frame 510.

Blades 551 and 552 are used for shuttering a conduit 575, and the blade 553 is used to eclipse the conduit 575 with filter 555. The blade 553 is coupled to the module frame 510 via axis 543, blade 551 is coupled to the module frame via axis 541, and blade 552 is coupled to the module frame 510 via axis 542. In some embodiments of the present invention, a recessed area 515 is disposed on the surface of the blade side of the module frame 510 such that the blades 551, 552, and 553 are substantially located within the recessed area 515. Also located on the module frame 510 is a conduit 575 for allowing light to pass therethrough.

In some embodiments of the present invention, a first solenoid (not shown) and the second solenoid are located on the opposite side of the module frame 510, the solenoid side of the module frame 510. According to these embodiments, a first arm (not shown) and a first pin 524 are coupled to a first solenoid (not shown) and a second arm (not shown) and a second pin 534 are coupled to a second solenoid (not shown). As explained below, the first pin 524 is actuated by a first solenoid and the second pin 534 is actuated by a second solenoid.

Also located on the module frame 510 are channels 561 and 562, which allow the pins 524 and 534 to pass through the module frame and guide the movement of blades 551, 552, and 553. The pins 524 and 534 extend from the solenoid side of the module frame 510 into the blade side of the module frame 510. The pin 534 extends into a guide 583 located on the blade 553, and the pin 524 extends into a guide 581 located on the blade 551 and into a guide 582 on blade 552. Accordingly, the blade 553 is movable by moving the pin 534 and the blades 551 and 552 are movable by moving the pin 524.

In some embodiments of the present invention, the guides 581 and 582 are configured such that both blades 551 and 552 are moved upon actuation of the pin 524. As such, two smaller blades are able to accomplish the same shuttering as a single, larger blade, thus enabling the module frame to be used in miniature applications.

In some embodiments of the present invention, the miniature camera module has a substantially rectangular shape and has height and width dimensions from 5 millimeters to 10 millimeters, and has a conduit radius of approximately 1 millimeter. In other embodiments of the present invention, miniature camera module frames are custom-made for any given miniature camera applications. In some embodiments, the radius of the conduit in the module frame is either approximately 2.2 millimeters, approximately 2.6 millimeters, or approximately 3.5 millimeters.

Figure 5C:
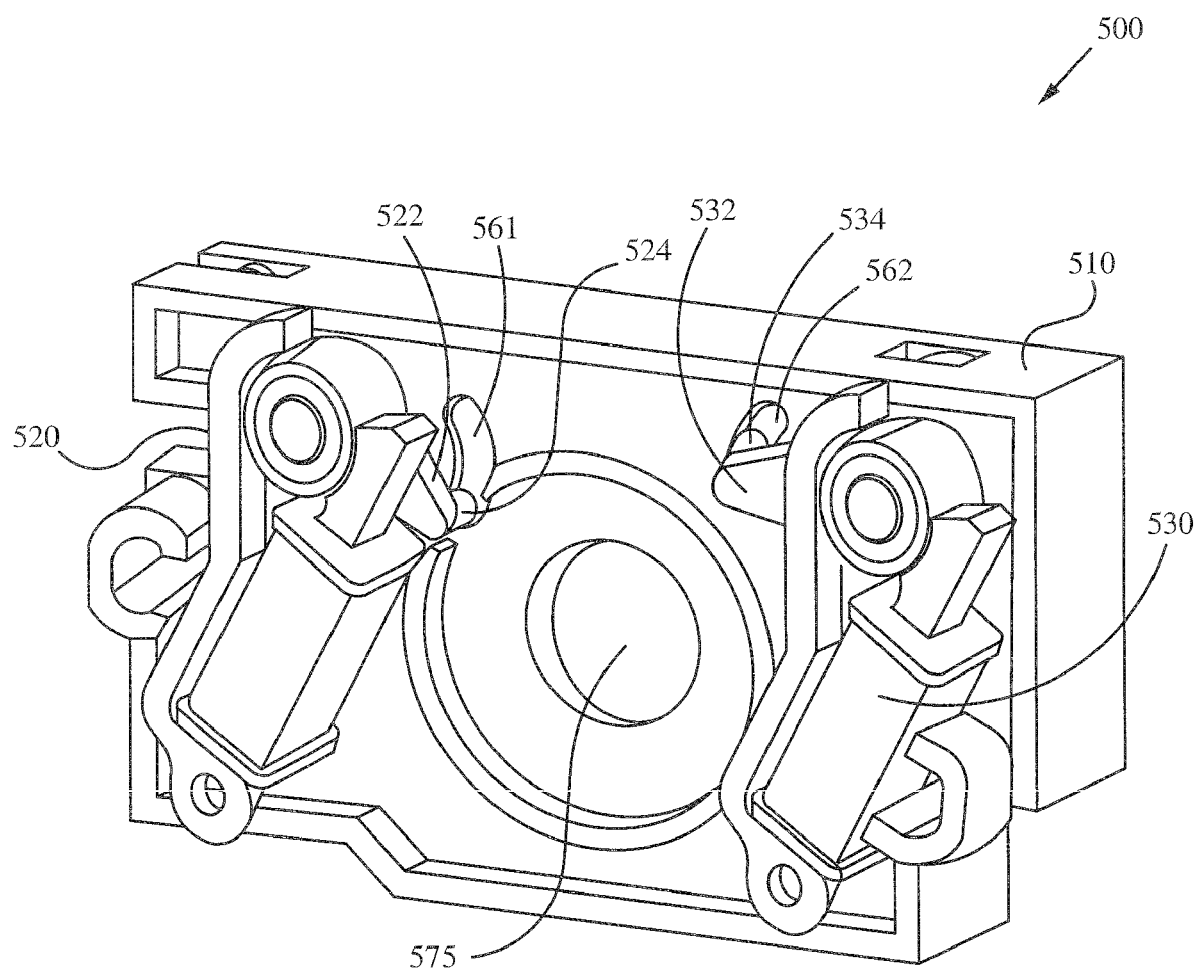
FIG. 5C illustrates a schematic perspective view of a miniature camera module with two solenoids to control a filter blade and two shuttering blades according to some embodiments of the present invention.

FIG. 5C illustrates a schematic side view of the solenoid side of the module frame 510 according to some embodiments of the present invention. FIG. 5C illustrates the opposite side of the module frame 510 as is presented in FIG. 5B. As such, a first solenoid 520 and a second solenoid 530 are coupled to the module frame 510. The first solenoid is coupled to an arm 522 and a pin 524. Likewise, the second solenoid 530 is coupled to an arm 532 and pin 534. Also shown in FIG. 5B are the channels 561 and 562 and the conduit 575. As explained above, the solenoids 520 and 530 actuate the pins 524 and 534, causing the blades 551 and 552 and the filter 555 to at least partially eclipse the conduit 575

Figure 5D:
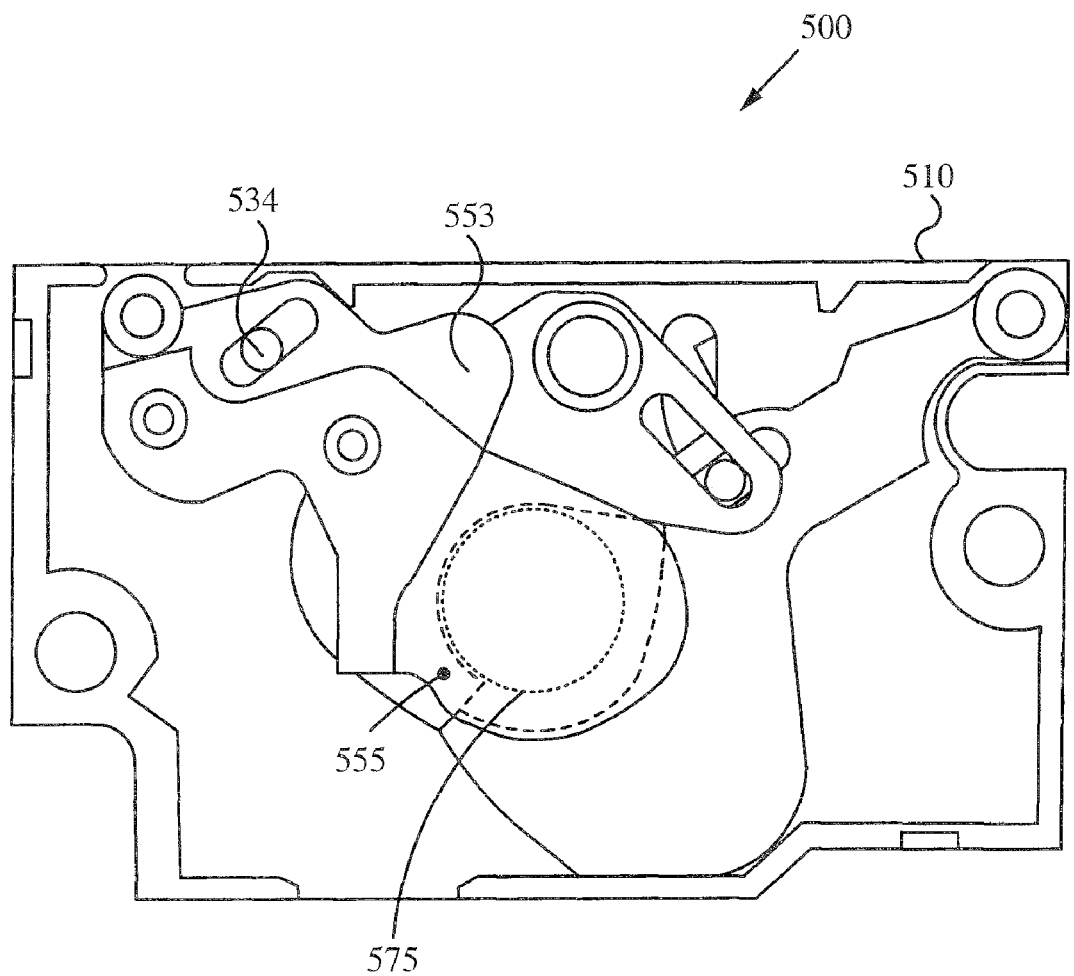
FIG. 5D illustrates a schematic side view of a miniature camera module with a filter blade covering a conduit and non-actuated two shuttering blades according to some embodiments of the present invention.

FIG. 5D illustrates a schematic side view of the blade side of the module frame 510 after the pin 534 is actuated by the solenoid 530. As such, the blade 553 has rotated and the filter 555 eclipses the conduit 575 (indicated with dashed lines). In FIG. 5D, the blades 551 and 552 have not been actuated and are in the open position.

Figure 5E:
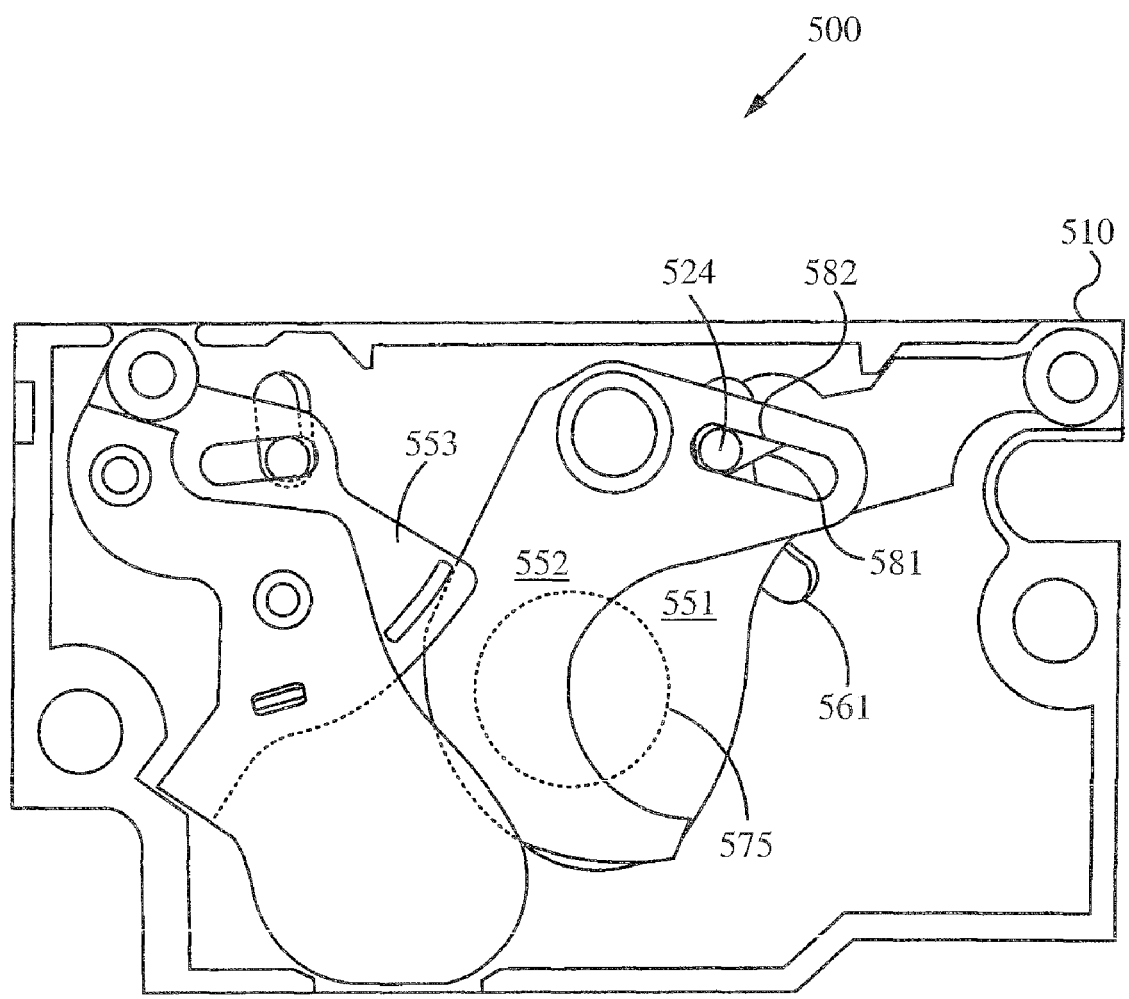
FIG. 5E illustrates a schematic side view of a miniature camera module with a non-actuated filter blade and two shuttering blades shuttering a conduit according to some embodiments of the present invention.

FIG. 5E illustrates a schematic side view of the blade side of the module frame 510 after the pin 524 has been actuated by the solenoid 520. Accordingly, the blades 551 and 552 are forced into an actuated position as the pin 524 exerts force on the guides 581 and 582 as it passes through channel 561. According to some embodiments of the present invention, the blades 551 and 552 are opaque and, as such, the blades 551 and 552 serve as a shutter to completely block light from passing through the conduit 575. In FIG. 5E, the filter blade 553 has not been actuated and is in the open position.

Figure 6A:
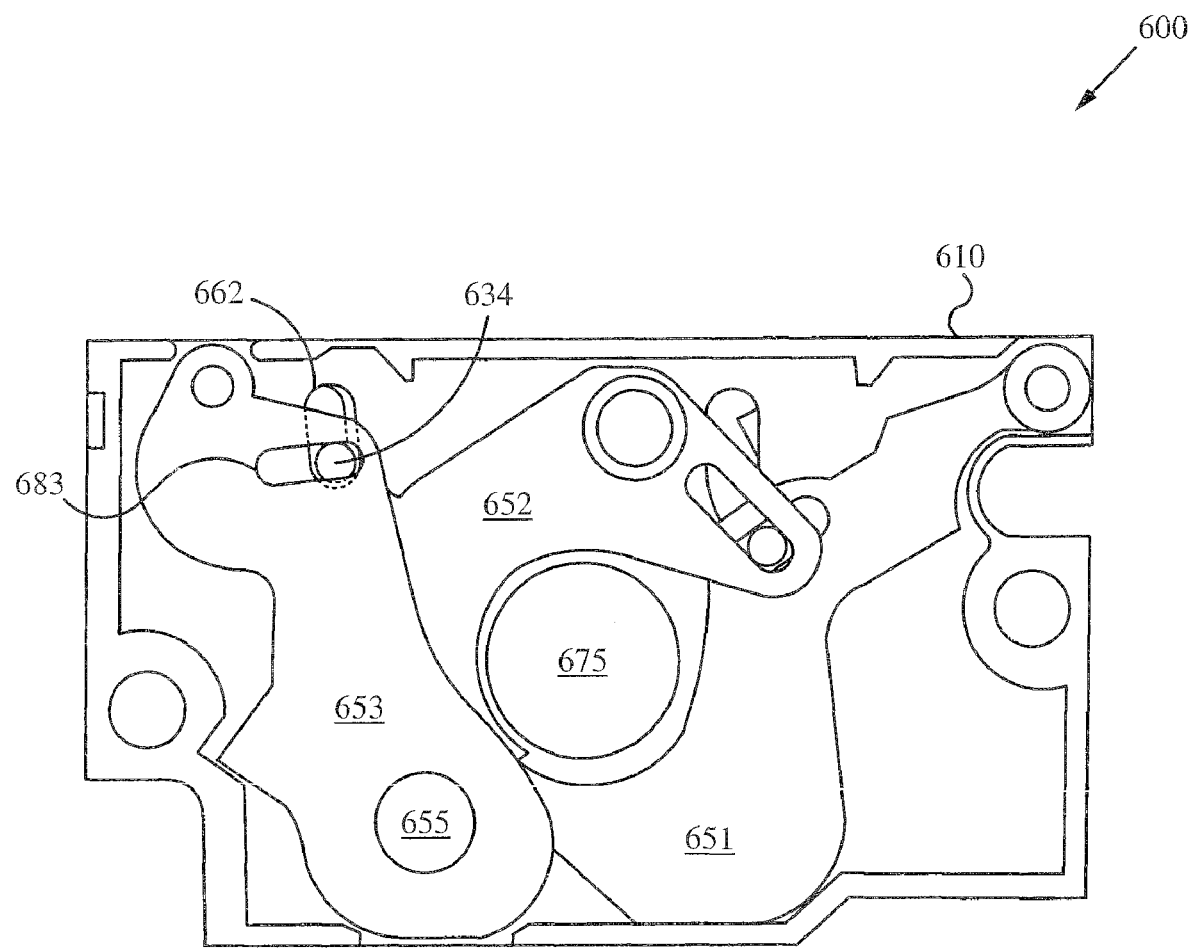
FIG. 6A illustrates a schematic side view of a miniature camera module with a non-actuated aperture blade and two non-actuated shuttering blades according to some embodiments of the present invention.
Figure 6B:
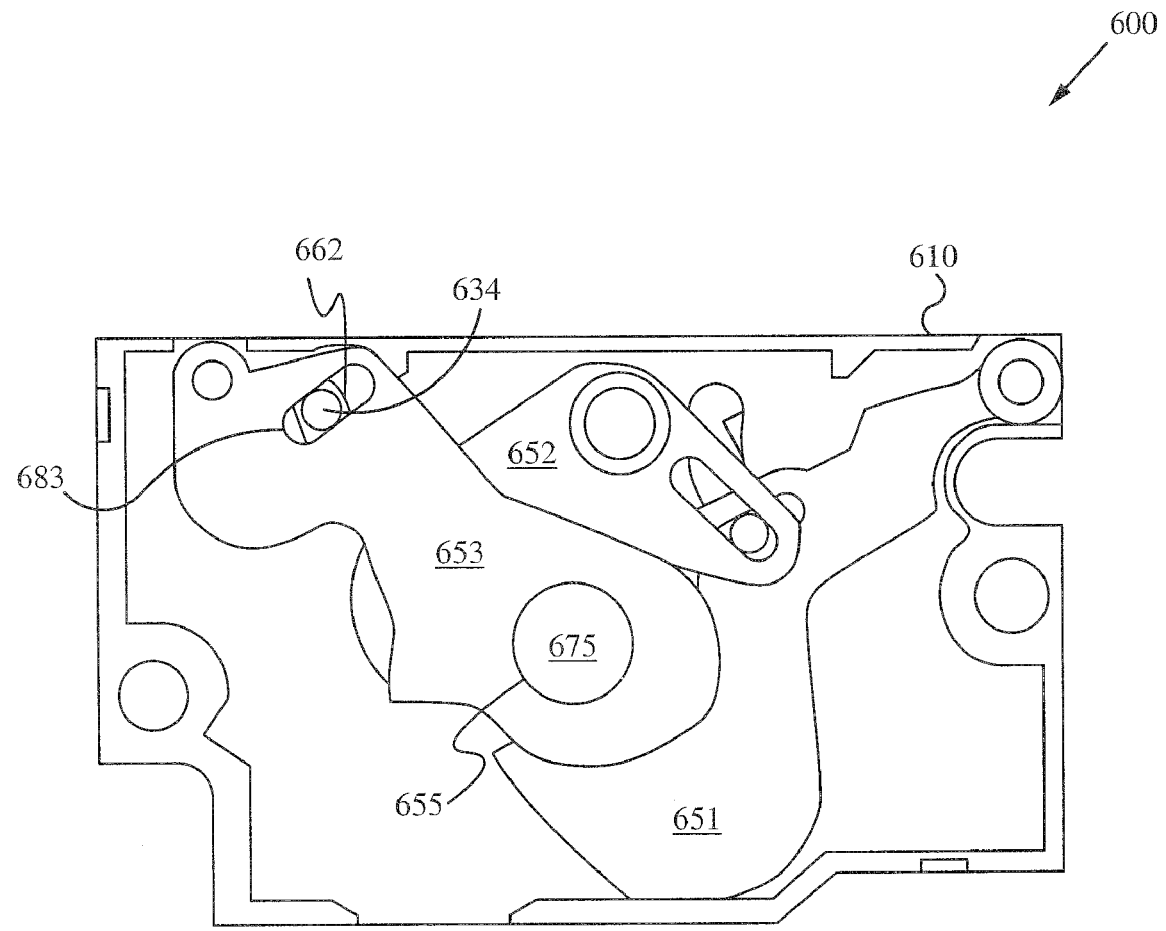
FIG. 6B illustrates a schematic side view of a miniature camera module with an aperture blade partially covering a conduit and two non-actuated shuttering blades according to some embodiments of the present invention.

FIGS. 6A-B illustrates a schematic side view of a miniature camera module 600 according to some embodiments of the present invention. Miniature camera module 600 is similar to miniature camera module 500 in FIGS. 5A-E, except that it substitutes an aperture blade in the place of the filter blade. According to these embodiments, two blades 651 and 652 are configured to shutter a conduit 675, and a third blade 653 is designed with an aperture 655 to partially block the conduit 675. The aperture blade 653 is actuated as a pin 634 moves through the channel 662 and exert a force on the aperture blade 653 via guide 683. When actuated, the aperture blade 653 partially eclipses the conduit 675, as shown in FIG. 6B.

According to the embodiments described in FIGS. 5A-6B, more than one solenoid are used to provide the ability to perform dual-blade shuttering and the ability to use an additional blade to filter and/or provide an aperture to miniature camera applications. Dual-blade shuttering allows the camera module to be used in miniature applications and results in optimized shutter speeds. Furthermore, including an additional blade, used to aperture or filter incident light, is advantageous in zoom-function camera modules.

Figure 7:
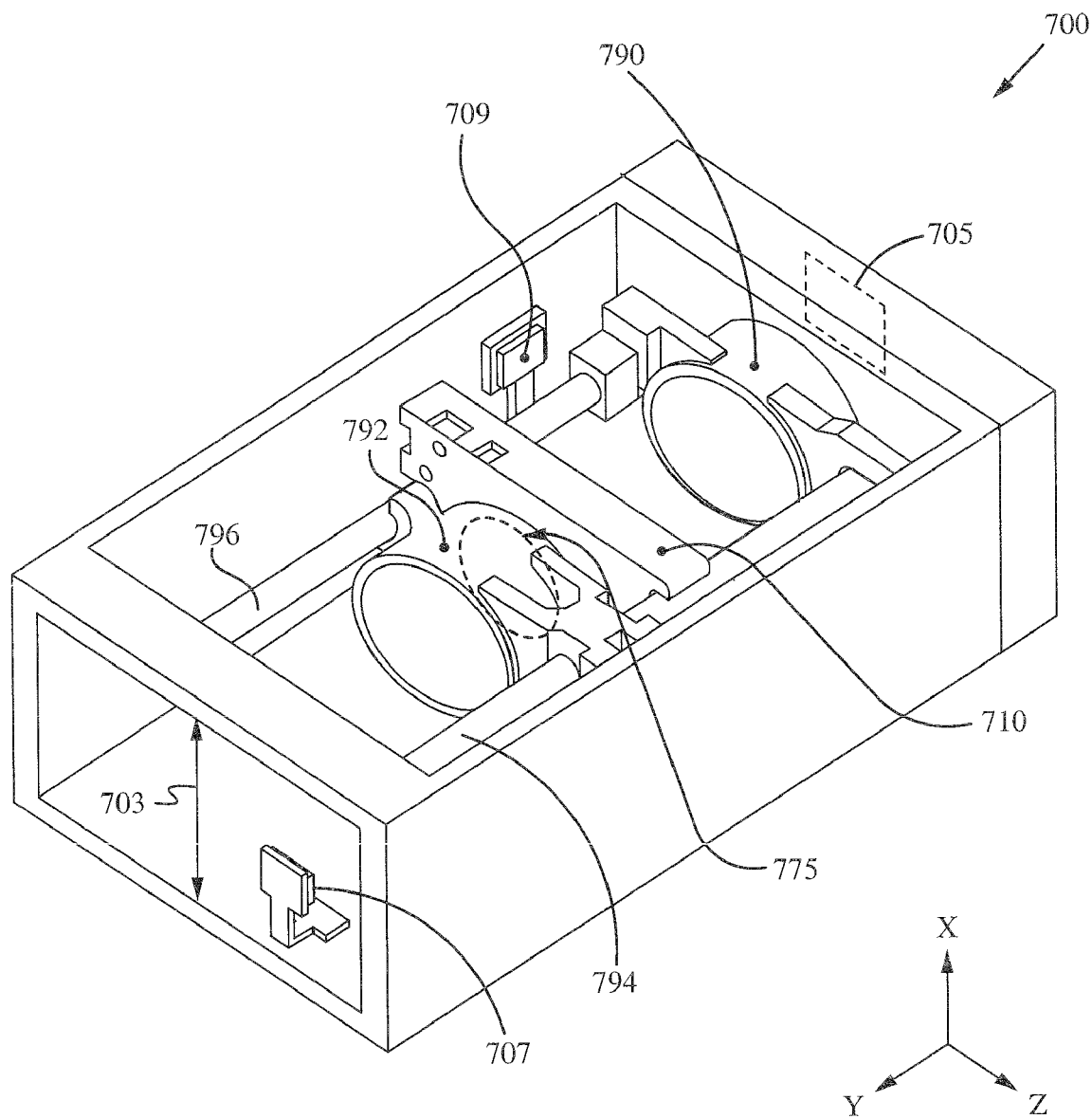
FIG. 7 illustrates a schematic perspective view of a miniature camera module housed within a camera chassis.

As explained above, it is an object of the present invention to position the miniature camera module within a camera chassis such that the conduit of the miniature camera module lines up with an image imaging surface. FIG. 7 illustrates a perspective view of the miniature camera module 710 housed within a camera chassis 700 according to some embodiments of the present invention. As shown, the camera chassis 700 comprises an opening 703 for receiving light to form an image. The camera chassis 700 also comprises a first optics group 790 and a second optics group 792. Typically, the optics groups 790 and 792 comprise one or more optical elements, such as lenses. In some embodiments, the miniature camera module 710 is located adjacent the second optics group 792 and between the first optics group 790 and the second optics group 792. It is contemplated that other optics group configurations are within the scope of the present invention. For example, in some embodiments, only one optics group is employed, while in other embodiments, three optics groups are employed.

The miniature camera module 710 comprises a conduit 775 (indicated as a dotted circle) passing through its surface. The miniature camera module 710 is configured such that light passing through the second optics group 792, travels through the conduit 775 on the miniature camera module 710, through the first optics group 790, and then falls incident upon a recording surface 705. In some embodiments of the present invention, the first optics group 790 is positioned in front of the recording surface 105. The first optics groups 790 is used to cause light passing therethrough to fall substantially perpendicularly incident upon the recording surface 705.

In some embodiments, the miniature camera chassis 700 is also configured with a first guide post 794 and a second guide post 796. The first optics group 790 and the second optics group 792 are slidably coupled to the first and second guide post 794 and 796. As such, the first optics group 790 and the second optics group 792 are able to move along the first guide post 794 and the second guide post 796 in the Y-direction, thereby affecting the light properties such as the focal point, depth of field, etc. In some embodiments, the miniature camera chassis 700 comprises a zoom/auto-focus camera chassis. Examples of such a zoom/auto-focus module are further described in U.S. Pat. No. 7,531,773, entitled "AUTO-FOCUS AND ZOOM MODULE HAVING A LEAD SCREW WITH ITS ROTATION RESULTS IN TRANSLATION OF AN OPTICS GROUP," which is hereby incorporated by reference as if set forth herein.

In some embodiments, the miniature camera chassis 700 fits within a miniature housing and is incorporated into one of a number of consumer electronic devices, such as cellular telephones, personal data assistants, etc. According to these embodiments, the relative positions of the optics groups 790 and 792 are tracked in order to communicate information to a processor for image processing purposes. In some embodiments, such tracking is achieved using one or more sensors 707, 709. In some embodiments, the miniature camera module 710 also contains one or more solenoids used to control one or more blades. The one or more blades are configured to at least partially eclipse the conduit 775 upon actuation of the one or more solenoids, as discussed above, further affecting image processing.

In some embodiments of the present invention, the imaging surface 705 is a photographic film or plate. In other embodiments of the present invention, the imaging surface 705 is an array of charge-coupled devices (CCD) or CMOS sensors. However, any imaging surface 705 can be used in conjunction with the present invention. The camera chassis 700 also contains the other devices utilized in known methods of photography.

In operation, the miniature camera module 710 alters the amount and/or quality of light passing therethrough by utilizing one or more solenoids one or more blades as explained in the examples above. The camera chassis 700 couples with external devices through an electronic coupling. In some embodiments of the present invention, the miniature camera module is integrated within a number of consumer electronic devices including, but not limited to cell phones and personal digital assistants.

The miniature camera module of the present invention can be manufactured in a variety of different ways. However, in a preferred method of manufacturing the miniature camera module, the method comprises providing a miniature camera chassis and a miniature camera module frame. The miniature camera chassis comprises an opening configured to allow light to enter the miniature camera chassis, a lens package, and an imaging surface. Providing the miniature camera module frame comprises forming a conduit passing through the miniature module frame such that light is able to pass therethrough, and coupling a first blade to the module frame, wherein the first blade is configured to rotate about a first axis between an open position and a closed position. The first blade does not eclipse the conduit at all when in the open position and the first blade at least partially eclipses the conduit when in the closed position. A first solenoid is coupled to the module frame and is configured to receive a signal. A first pin is coupled to the first solenoid such that an actuation of the first solenoid causes the first pin to rotate the first blade from the open position to the closed position. The miniature camera module frame is positioned between the opening and the imaging surface such that light entering the opening is directed through the conduit to the imaging surface. The miniature camera module is provided the ability to supply a signal to the first solenoid, wherein the signal actuates the first blade, causing the first blade to at least partially eclipse the conduit. The first blade alters the light passing through the conduit upon actuation of the first solenoid.

In some embodiments, the first blade completely obstructs the light passing through the conduit upon actuation of the first solenoid. In some embodiments, the first blade only partially obstructs the light passing through the conduit upon actuation of the first solenoid. In some embodiments, the first blade filters the light passing through the conduit upon actuation of the first solenoid. In some embodiments, the first blade has a substantially rectangular shape to accommodate miniature camera applications having a substantially rectangular imaging surface.

As described, the present invention solves some of the problems present in existing miniature camera systems. The present invention provides a practical way to shutter light and to provide apertures and filters to alter the quality of light in miniature camera applications. By using more than one blade to shutter a conduit, the miniature camera module is able to be smaller since the minimum size of each shutter is smaller than the size of the conduit. Furthermore, using more than one smaller blade to shutter a conduit results in faster shutter speeds than by using one, larger shutter.

Due to advantages of the present invention, the miniature camera module is able to be integrated within small scale consumer electronic devices including, but not limited to, cellular phones and personal digital assistants. Also, the present invention allows filters and apertures to be used in conjunction with the shutter blades while being housing within the same miniature camera module. As such, the miniature camera module is able to be used in miniature camera applications utilizing zoom features.

The present application has been described in terms of specific embodiments incorporating details to facilitate the understanding of the principles of construction and operation of the power amplification circuit. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A miniature camera module comprising:
   a module frame comprising a surface with a conduit passing through the surface, thereby allowing light to pass through the surface via the conduit;
   a first blade coupled to the module frame and configured to rotate about a first axis between an open position and a closed position, wherein the first blade does not eclipse the conduit at all when in the open position and the first blade at least partially eclipses the conduit when in the closed position, and wherein the first blade comprises a first blade channel;
   a first solenoid coupled to the module frame;
   a first pin coupled to the first solenoid, wherein the first pin extends at least partially into the first blade channel such that the first pin moves within the first blade channel and applies force to the first blade in response to an actuation of the first solenoid, and wherein the actuation of the first solenoid causes the first pin to rotate the first blade from the open position to the closed position; and
   a second blade coupled to the module frame and configured to rotate about a second axis between an open position and a closed position, wherein the second blade does not eclipse the conduit at all when in the open position and the second blade at least partially eclipses the conduit when in the closed position, and wherein the second blade comprises a second blade channel, wherein the first pin extends at least partially into the second blade channel such that the first pin moves within the second blade channel and applies force to the second blade in response to the actuation of the first solenoid,
   wherein the first blade channel and the second blade channel are configured such that the first pin effectuates movement of the first blade before effectuating movement of the second blade.

2. The miniature camera module of claim 1, further comprising a frame channel disposed in the module frame, wherein the first pin passes through the frame channel from one side of the module frame, on which the first solenoid is disposed, to an opposite side of the module frame, on which the first blade is disposed, and wherein the first pin moves within the frame channel in response to the actuation of the first solenoid.

3. The miniature camera module of claim 1, wherein the second blade comprises an aperture disposed on the surface of the second blade, the aperture having a smaller diameter than the conduit such that the second blade only partially obstructs light from passing through the conduit while the second blade is in the closed position.

4. The miniature camera module of claim 1, wherein the second blade comprises a filter coupled to the second blade such that the filter at least partially filters light from passing through the conduit while the second blade is in the closed position.

5. The miniature camera module of claim 4, wherein the filter is either a wavelength-specific filter configured to filter out a portion of light passing through the conduit that has a particular range of wavelengths or a neutral-density filter configured to filter all wavelengths of light passing through the conduit.

6. The miniature camera module of claim 1, wherein the first blade comprises an aperture disposed on the surface of the first blade, the aperture having a smaller diameter than the conduit such that the first blade only partially obstructs light from passing through the conduit while the first blade is in the closed position.

7. The miniature camera module of claim 1, wherein the first blade comprises a filter coupled to the first blade such that the filter at least partially filters light from passing through the conduit while the first blade is in the closed position.

8. The miniature camera module of claim 7, wherein the filter is either a wavelength-specific filter configured to filter out a portion of light passing through the conduit that has a particular range of wavelengths or a neutral-density filter configured to filter all wavelengths of light passing through the conduit.

9. The miniature camera module of claim 1, wherein:
   the first blade and the second blade comprise completely opaque shutters, and
   the first blade and the second blade work together to completely eclipse the conduit upon actuation of the first solenoid.

10. The miniature camera module of claim 1, wherein:
    the second blade channel is a substantially straight pathway; and
    the second blade is configured such that the second blade channel is substantially parallel to the initial movement of the first pin when the second blade is in the open position and the movement of the first blade has been effectuated by the first pin in response to the actuation of the first solenoid.

11. The miniature camera module of claim 9, further comprising:
a third blade coupled to the module frame and configured to rotate about a third axis between an open position and a closed position, wherein the third blade does not eclipse the conduit at all when in the open position and the third blade at least partially eclipses the conduit when in the closed position;
a second solenoid coupled to the module frame; and
a second pin coupled to the second solenoid, wherein an actuation of the second solenoid causes the second pin to rotate the third blade from the open position to the closed position.

12. The miniature camera module of claim 11, wherein:
the first solenoid and the second solenoid are disposed on the same side of the module frame as each other; and
the first blade, the second blade, and the third blade are disposed on the same side of the module frame as each other.

13. The miniature camera module of claim 11, wherein the third blade comprises an aperture disposed on the surface of the third blade, the aperture having a smaller diameter than the conduit such that the third blade only partially obstructs light from passing through the conduit while the third blade is in the closed position.

14. The miniature camera module of claim 11, wherein the third blade comprises a filter coupled to the third blade such that the filter at least partially filters light from passing through the conduit while the third blade is in the closed position.

15. The miniature camera module of claim 1, further comprising:
a miniature camera chassis comprising an enclosure with an opening configured to allow light to enter the miniature camera chassis;
an optical train in line with the opening, the optical train comprising at least one lens for focusing the light entering the miniature camera chassis; and
an imaging surface, wherein the module frame is positioned between the optical train and the imaging surface such that at least a portion of the focused light passes through the conduit of the module frame and falls incident upon the imaging surface, thereby producing a recordable image.

16. The miniature camera module of claim 1, wherein the conduit and a portion of the first blade each have a substantially rectangular shape.

17. The miniature camera module of claim 1, wherein:
the module frame comprises a recessed area; and
the first blade is configured to rotate between the open position and the closed position within the recessed area.

18. A miniature camera module comprising:
a module frame comprising a surface with a conduit passing through the surface, thereby allowing light to pass through the surface via the conduit;
a first blade coupled to the module frame and configured to rotate about a first axis between an open position and a closed position, wherein the first blade does not eclipse the conduit at all when in the open position and the first blade at least partially eclipses the conduit when in the closed position;
a first solenoid coupled to the module frame;
a first pin coupled to the first solenoid, wherein an actuation of the first solenoid causes the first pin to rotate the first blade from the open position to the closed position;
a first blade channel disposed in the first blade, wherein the first pin extends at least partially into the first blade channel such that the first pin moves within the first blade channel and applies force to the first blade in response to the actuation of the first solenoid;
a first frame channel disposed in the module frame, wherein the first pin passes through the first frame channel from one side of the module frame, on which the first solenoid is disposed, to an opposite side of the module frame, on which the first blade is disposed, and wherein the first pin moves within the first frame channel in response to the actuation of the first solenoid;
a second blade coupled to the module frame and configured to rotate about a second axis between an open position and a closed position, wherein the second blade does not eclipse the conduit at all when in the open position and the second blade at least partially eclipses the conduit when in the closed position; and
a second blade channel disposed within the second blade, wherein the first pin extends at least partially into the second blade channel such that the first pin moves within the second blade channel and applies force to the second blade in response to the actuation of the first solenoid,
wherein the first blade channel and the second blade channel are configured such that the first pin effectuates movement of the first blade before effectuating movement of the second blade.

19. The miniature camera module of claim 18, wherein the second blade comprises a filter coupled to the second blade such that the filter at least partially filters light from passing through the conduit while the second blade is in the closed position, and wherein the second blade does not eclipse the conduit at all when in the open position.

20. The miniature camera module of claim 18, wherein the first blade and the second blade comprise completely opaque shutters, and wherein the first blade and the second blade work together to completely eclipse the conduit upon actuation of the first solenoid.

21. The miniature camera module of claim 18, further comprising:
a third blade coupled to the module frame and configured to rotate about a third axis between an open position and a closed position, wherein the third blade does not eclipse the conduit at all when in the open position and the third blade at least partially eclipses the conduit when in the closed position;
a second solenoid coupled to the module frame;
a second pin coupled to the second solenoid, wherein an actuation of the second solenoid causes the second pin to rotate the third blade from the open position to the closed position; and
a third blade channel disposed within the third blade, wherein the second pin extends at least partially into the third blade channel such that the second pin moves within the third blade channel and applies force to the third blade in response to the actuation of the second solenoid.

22. The miniature camera module of claim 21, wherein the third blade comprises an aperture disposed on the surface of the third blade, the aperture having a smaller diameter than the conduit such that the third blade only partially obstructs light from passing through the conduit while the third blade is in the closed position.

23. The miniature camera module of claim 21, wherein the third blade comprises a filter coupled to the third blade such that the filter at least partially filters light from passing through the conduit while the third blade is in the closed position.

24. The miniature camera module of claim 22, further comprising:

a miniature camera chassis comprising an enclosure with an opening configured to allow light to enter the miniature camera chassis;

an optical train in line with the opening, the optical train comprising at least one lens for focusing the light entering the miniature camera chassis; and an imaging surface, wherein the module frame is positioned between the optical train and the imaging surface such that at least a portion of the focused light passes through the conduit of the module frame and falls incident upon the imaging surface, thereby producing a recordable image.

* * * * *